United States Patent [19]

Terada et al.

[11] Patent Number: 6,008,155
[45] Date of Patent: Dec. 28, 1999

[54] EXHAUST EMISSION CONTROL CATALYST AND PROCESS FOR PRODUCING THE SAME

[75] Inventors: Kazuhide Terada; Takeshi Narishige; Naohiro Satoh; Yoshikazu Fujisawa; Yoshiyuki Nakanishi, all of Saitama, Japan

[73] Assignee: Honda Giken Kogyo Kabushiki Kaisha, Tokyo, Japan

[21] Appl. No.: 08/919,482

[22] Filed: Aug. 28, 1997

Related U.S. Application Data

[63] Continuation of application No. 08/451,665, filed as application No. PCT/JP94/01614, Sep. 29, 1994, abandoned.

[30] Foreign Application Priority Data

Sep. 29, 1993 [JP] Japan .................................. 5-243351
Jul. 8, 1994 [JP] Japan .................................. 6-157502
Sep. 14, 1994 [JP] Japan .................................. 6-220232

[51] Int. Cl.[6] .............................. B01J 21/04; B01J 21/12; B01J 29/06; B01J 29/40
[52] U.S. Cl. ............................. 502/355; 502/71; 502/77
[58] Field of Search .................................. 502/355, 71, 77

[56] References Cited

U.S. PATENT DOCUMENTS

| | | | |
|---|---|---|---|
| 4,172,047 | 10/1979 | Gandhi et al. | 252/466 |
| 4,619,909 | 10/1986 | Ono et al. | 502/303 |
| 5,248,650 | 9/1993 | Sekiba et al. | 502/303 |
| 5,427,989 | 6/1995 | Kanesaha et al. | 502/66 |

FOREIGN PATENT DOCUMENTS

| | | |
|---|---|---|
| 55-41894 | 3/1980 | Japan . |
| 56-27295 | 6/1981 | Japan . |
| 57-87837 | 6/1982 | Japan . |
| 62241552 | 4/1986 | Japan . |
| 62-10684 | 5/1987 | Japan . |
| 62-241552 | 10/1987 | Japan . |
| 5177136 | 7/1993 | Japan . |
| 5184876 | 7/1993 | Japan . |
| 5293380 | 11/1993 | Japan . |

OTHER PUBLICATIONS

JP 800163728 Abstract in English, 1980 no month.
JP 780133147 Abstract in English, 1978 no month.

*Primary Examiner*—Glenn Caldarola
*Assistant Examiner*—Alexander G. Ghyka
*Attorney, Agent, or Firm*—Lyon & Lyon LLP

[57] ABSTRACT

An exhaust emission control catalyst having an excellent NOx converting capability includes a modified alumina which has a θ-phase and an α-phase and has an α-conversion rate R in a range of $0.5\% \leq R \leq 95\%$, and a catalytic metal carried in the modified alumina, e.g., platinum (Pt). In addition, a catalyst including a catalyst material which is the above-described catalyst including the modified alumina and the catalytic metal, and an aluminosilicate or cerium oxide ($CeO_2$), also has an excellent NOx converting capability.

4 Claims, 12 Drawing Sheets

EXHAUST EMISSION CONTROL CATALYST AND PROCESS FOR PRODUCING THE SAME

This application is a Continuation Application, of application Ser. No. 08/451,665, which is the national stage of international application PCT/JP94/01614, filed Sep. 29, 1994 and now abandoned.

BACKGROUND OF THE INVENTION

1. Field of the Invention

The present invention relates to an exhaust emission control catalyst, and particularly, to such a catalyst including an alumina and a catalytic metal carried in the alumina, and a catalyst including: cerium oxide ($CeO_2$) having a catalyst material as the former catalyst; or a solid acidic aluminosilicate which includes a molecular sieves property and a catalyst material as the former catalyst; and the present invention also relates to a process for producing the exhaust emission control catalyst.

2. Description of the Prior Art

An active alumina having a γ-phase and/or a η-phase has been conventionally used as the above-described alumina, and platinum has been used as the catalytic metal. The aluminosilicate has a function as a support and a hydrocarbon (HC) adsorbing capability (for example, see Japanese Patent Publication No. 27295/1981). The cerium oxide ($CeO_2$) has a function as a support and a nitrogen oxide (NOx) adsorbing capability. In this case, platinum (Pt) is used as the catalytic metal (for example, see Japanese Patent Application Laid-open No. 184876/1993).

However, the prior art catalyst suffers from a following problem: If platinum (Pt) or palladium is carried in the active alumina, the platinum (Pt) or palladium (Pd) is dispersed, because it is multi-porous and has a large specific surface area. Therefore, the hydrocarbon (HC) adsorbing capability and nitrogen oxide (NOx) adsorbing capability provided by the platinum (Pt) or palladium (Pd) are enhanced, but in an atmosphere containing an excessive amount of air (e.g., an air-fuel ratio A/F≳24), a complete oxidization of hydrocarbon (HC), namely, a oxidizing reaction represented by $HC \rightarrow CO_2 + H_2O$ advances, so that the amount of active aldehyde (CHO) produced, which is a product of partial oxidation of hydrocarbon (HC) and has a NOx reducing capability, is insufficient, and a reduction-impeding effect by oxygen adsorbed on the surface of platinum (Pt) or the like is liable to be produced. For this reason, the reducing conversion of NOx cannot be sufficiently performed, and the range of temperature for conversion of NOx is narrowed.

SUMMARY OF THE INVENTION

It is an object of the present invention to provide an exhaust emission control catalyst of the above-described type, and a process for producing the same, wherein the partial oxidation of hydrocarbon can occur in a wider range of temperature of an exhaust gas by using an alumina having a specific surface area smaller than that of an active alumina, thereby increasing the NOx percent conversion even in an atmosphere containing an excessive amount of oxygen.

To achieve the above object, according to the present invention, there is provided an exhaust emission control catalyst comprising an alumina, and a catalytic metal carried in the alumina, the catalytic metal being at least one element selected from the platinum group, wherein the alumina comprises a modified alumina which has a θ-phase and an α-phase and has an α-conversion rate R in a range of $0.5\% \leq R \leq 95\%$.

There is also provided a process for producing an exhaust emission control catalyst, comprising the steps of subjecting an active alumina to a thermal treatment at a heating temperature T set in a range of $800°\ C. \leq T \leq 1,100°\ C.$ to phase-convert the active alumina into a modified alumina having a θ-phase and an α-phase and having an α-conversion rate R in a range of $0.5\% \leq R \leq 95\%$, and carrying at least one catalytic metal selected from the platinum group in the modified alumina.

In addition, there is provided a process for producing an exhaust emission control catalyst, including the steps of carrying at least one catalytic metal selected from the platinum group in a modified alumina, and subjecting the active alumina with the catalytic metal carried therein to a thermal treatment at a heating temperature set in a range of $800°\ C. \leq T \leq 1,100°\ C.$ to phase-convert the active alumina into a modified alumina having a θ-phase and an α-phase and having an α-conversion rate R in a range of $0.5\% \leq R \leq 95\%$.

For example, if boehmite represented by a structural formula 4 [AlO(OH)] is heated, a phase conversion represented by boehmite phase→γ-phase→η-phase→θ-phase α-phase occurs with an increase in temperature, wherein the specific surface area of the γ-phase< the specific surface area of the β-phase< the specific surface area of the θ-phase< the specific surface area of the α-phase.

In the catalyst, the specific surface area of the modified alumina is smaller than that of the active alumina having the γ-phase or the like, because it has the θ- and α-phases. Therefore, if the catalytic metal is carried in the modified alumina, the dispersion of the metal is suppressed, as compared with the case where the catalytic metal is carried in the active alumina and hence, the catalyst exhibits a relatively weak oxidizing capability to hydrocarbon (HC).

Thus, the hydrocarbon is partially oxidized to produce an active aldehyde (CHO) having a reducing capability. The production of the active aldehyde is performed in a wider range of temperature of an exhaust gas and hence, nitrogen oxide (NOx) is reduced and converted by the active aldehyde (CHO), and the range of temperature for such conversion is widened.

The NOx converting capability of the catalyst is higher in a lower range of temperature of the exhaust gas. Therefore, if this catalyst is combined with a catalyst capable of exhibiting a higher NOx converting capability in a higher range of temperature, e.g., a catalyst including a zeolite and cerium oxide ($CeO_2$) carried therein, the range of temperature for conversion of NOx can be further widened.

Further, because the modified alumina has the θ-phase which is a metastable phase and the α-phase which is a stable phase, the closing of fine pores resulting from the phase conversion of the active alumina, the embedding of the catalytic metal due to this closing and the like are difficult to occur and therefore, the catalyst has an excellent heat resistance, and the catalytic capability is less degraded.

However, if the α-conversion rate R of the modified alumina is smaller than 0.5%, the modified alumina has a specific surface area decreased at a small degree and hence, it is impossible to achieve an intended purpose. On the other hand, if the α-conversion rate R of the modified alumina is larger than 95%, the modified alumina has a too-decreased specific surface area, resulting in a reduced function of the catalytic metal.

With this producing process, it is possible to easily produce a catalyst having characteristics as described above. However, if the heating temperature T in the thermal treatment is lower than 800° C., it is failed to smoothly advance the phase conversion. On the other hand, if T>1,100° C., it is difficult to control the upper limit value (R=95%) of the α-conversion rate R.

It is a further object of the present invention to provide an exhaust emission control catalyst of the above-described type and a process for producing the same, wherein an alumina having a specific surface area decreased to a value smaller than that of the active alumina is used, and a particular amount of catalytic metal is carried in the alumina, so that a partial oxidization of hydrocarbon (HC) can occur at a wider range of temperature of an exhaust gas; and a particular amount of aluminosilicate is also used, so that the adsorption and desorption of an active aldehyde (CHO) can be performed by the aluminosilicate, thereby increasing the NOx percent conversion can be increased even in an atmosphere containing an excessive amount of oxygen.

To achieve the above object, according to the present invention, there is provided an exhaust emission control catalyst including a catalyst material and a solid acidic aluminosilicate having a molecular sieves property, the catalyst material being formed of an alumina and a catalytic metal carried in the alumina, wherein the alumina is a modified alumina having an α-conversion rate R set in a range of $0.1\% \leq R \leq 95\%$; the weight percent $A_1$ ($=\{A/(A+B)\} \times 100$) of the catalyst material is set in a range of 11% by weight$\leq A_1 <95\%$ by weight, wherein A represents an amount of catalyst material incorporated, and B represents an amount of aluminosilicate incorporated, and the catalytic metal is at least one element selected from the platinum group, the weight percent $a_1$ of the catalyst metal being set in a range of 0.1 by weight$<a_1 \leq 5\%$ by weight.

There is also provided a process for producing an exhaust emission control catalyst, including the steps of subjecting an active alumina to a thermal treatment at a heating temperature set in a range 800° C.$\leq T \leq 1,100°$ C. to produce a modified alumina having an α-conversion rate R in a range of $0.1\% \leq R \leq 95\%$ from the active alumina; carrying at least one element selected from the platinum group in the modified alumina to fabricate a catalyst material, the weight percent $a_1$ of the catalytic metal in the catalyst material being set in a range of 0.1% by weight$<a_1 \leq 5\%$ by weight; and mixing the catalyst material with a solid acidic aluminosilicate having a molecular sieves property, the weight percent $A_1$ ($=\{A/(A+B)\} \times 100$) of the catalyst material being set in a range of 11% by weight$\leq A_1 <95\%$ by weight, wherein A represents an amount of catalyst material incorporated, and B represents an amount of aluminosilicate incorporated.

If the α-conversion rate is set in the above-described range, the specific surface area of the modified alumina is smaller than that of the active alumina having the γ-phase or the like, because it has the α-phase. Therefore, if a particular amount of the catalytic metal is carried in the modified alumina, the dispersion of the metal is suppressed, as compared with the case where the catalytic metal is carried in the active alumina and hence, the catalyst exhibits a relatively weak oxidizing capability to hydrocarbon (HC).

Thus, the hydrocarbon is partially oxidized to produce an active aldehyde (CHO) having a NOx reducing capability. The production of the active aldehyde (CHO) is performed in a wider range of temperature of an exhaust gas, and the aluminosilicate adsorbs a portion of the active aldehyde (CHO) to store it therein and desorbs such portion to supply it. Thus, nitrogen oxide (NOx) is reduced and converted by the active aldehyde (CHO) which is free from the beginning and the active aldehyde which has become free as a result of desorption thereof, and the range of converting temperature is widened.

The NOx converting capability of the catalyst is higher at a lower temperature of the exhaust gas and hence, if this catalyst is combined with a catalyst capable of exhibiting a higher NOx converting capability at a higher temperature, e.g., a catalyst including an aluminosilicate and cerium oxide ($CeO_2$) carried therein, the range of temperature for conversion of nitrogen oxide (NOx) can be further widened.

Further, because the modified alumina has the α-phase which is a stable phase, the closing of fine pores in the active alumina resulting from the phase conversion, the embedding of the catalytic metal due to this closing and the like are difficult to occur. Therefore, the catalyst has an excellent heat resistance, and the catalytic capability is less degraded at a higher temperature.

However, if the α-conversion rate R of the modified alumina is smaller than 0.1%, the modified alumina has a specific surface area decreased at a small degree and hence, it is impossible to achieve an intended purpose. On the other hand, if the α-conversion rate R of the modified alumina is larger than 95%, the fine pores are closed with an excessive advancement of the α-conversion rate, so that the specific surface area of the modified alumina is substantially reduced. As a result, the dispersion of the catalytic metal is extremely degraded to remarkably decrease the NOx adsorbing capability. If the weight percent $A_1$ of the catalyst material is smaller than 11% by weight, the NOx percent conversion is lowered due to a decrease in catalytic capability. On the other hand, if $A_1 \geq 95\%$ by weight, the adsorbing and desorbing actions by the aluminosilicate are reduced and hence, the NOx percent conversion is likewise lowered.

Further, if the weight percent $a_1$ of the catalytic metal is equal to or smaller than 0.1% by weight, the NOx percent conversion is lowered due to a decrease in catalytic capability. On the other hand, even if the weight percent $a_1$ of the catalytic metal is set at a value smaller than 5% by weight, a NOx converting effect corresponding to an increase in amount of catalytic metal carried is not obtained.

This producing process makes it possible to easily mass-produce a catalyst having characteristics as described above. However, if the heating temperature T in the thermal treatment is lower than 800° C., it is failed to smoothly advance the phase conversion of the γ-phase and/or the η-phase into the α-phase. On the other hand, if T>1,100° C., it is difficult to control the upper limit value (R=95%) of the α-conversion rate R.

It is a yet further object of the present invention to provide an exhaust emission control catalyst of the above-described type and a process for producing the same, wherein an alumina having a decreased specific surface area smaller than that of an active alumina is used, and a catalytic metal is carried in the alumina, so that a partial oxidization of hydrocarbon (HC) occurs; and a particular amount of cerium oxide ($CeO_2$) is also used, so that a NOx adsorbing capability can be exhibited by the cerium oxide, thereby increasing the NOx percent conversion even in an atmosphere containing an excessive amount of oxygen.

To achieve the above object, according to the present invention, there is provided an exhaust emission control catalyst including a catalyst material formed of an alumina and a catalytic metal carried in the alumina, and cerium oxide ($CeO_2$), wherein the alumina is a modified alumina having an α-conversion rate R set in a range of $0.1\% \leq R \leq 98\%$, and the weight percent $A_1$ ($=\{A/(A+E)\} \times 100$) of the catalyst material is set in a range of 20% by weight<$A_1$<88% by weight, wherein A represents an amount of catalyst material incorporated, and E represents an amount of cerium oxide ($CeO_2$) incorporated.

According to the present invention, there is also provided a process for producing an exhaust emission control catalyst, including the steps of subjecting an active alumina to a thermal treatment at a heating temperature T set in a range of $800° C. \leq T \leq 1,100° C.$ to produce a modified alumina having an α-conversion rate R in a range of $0.1\% \leq R \leq 98\%$; carrying at least one catalytic metal selected from the platinum group in the modified alumina to fabricate a catalyst material; and mixing the catalyst material with cerium oxide ($CeO_2$), the weight percent $A_1$ ($=\{A/(A+E)\} \times 100$) of catalyst material incorporated being set in a range of 20% by weight<$A_1$<88% by weight, wherein A represents an amount of catalyst material incorporated, and E represents an amount of cerium oxide incorporated.

If the α-conversion rate R is set in the above-described range, the specific surface area of the modified alumina is smaller than that of the active alumina having the γ-phase or the like, because it has the a α-phase. Therefore, if the catalytic metal is carried in the modified alumina, the dispersion of the metal is suppressed, as compared with the case where the catalytic metal is carried in the active alumina, and hence, the catalyst material exhibits a relatively weak oxidizing capability to hydrocarbon (HC).

Thus, the hydrocarbon is partially oxidized to produce an active aldehyde (CHO) having a NOx reducing capability. The production of the active aldehyde (CHO) is performed in a wider range of temperature of an exhaust gas. On the other hand, the cerium oxide ($CeO_2$) exhibits a NOx adsorbing capability even in an atmosphere containing an excessive amount of oxygen and hence, the active aldehyde (CHO) is adsorbed on the cerium oxide ($CeO_2$) to reduce activated nitrogen oxide (NOx) to form nitrogen gas ($N_2$), carbon dioxide gas ($CO_2$) and water, thereby achieving the conversion of the nitrogen oxide (NOx). In this case, the active aldehyde (CHO) is more easily produced from an unsaturated hydrocarbon than from a saturated hydrocarbon, and free nitrogen oxide (NOx) is lower in activity than the adsorbed nitrogen oxide (NOx).

The production of the active aldehyde (CHO) by the partial oxidization of the hydrocarbon, the adsorption of the nitrogen oxide (NOx) and the reduction of the nitrogen oxide (NOx) by the active aldehyde (CHO) as described above occur at a temperature from a lower range of temperature to a higher range of temperature of an exhaust gas and hence, the range of temperature for purifying by the catalyst is widened.

Further, because the modified alumina has the α-phase which is a stable phase, the closing of fine pores in the active alumina resulting from the phase conversion, the embedding of the catalytic metal due to this closing and the like are difficult to occur and hence, the catalyst has an excellent heat resistance, and the catalytic capability is less degraded at a higher temperature.

However, if the α-conversion rate R of the modified alumina is smaller than 0.1%, the modified alumina has a specific surface area decreased at a small degree and hence, it is impossible to achieve an intended purpose. On the other hand, if $R \geq 95\%$, the fine pores are closed with an excessive advancement of the α-conversion rate, so that the specific surface area is substantially reduced, and as a result, the dispersion of the catalytic metal is extremely degraded to remarkably decrease the NOx adsorbing capability.

If the weight percent $A_1$ of the catalyst material is equal to or smaller than 20% by weight, the NOx percent conversion is lowered due to a decrease in catalytic capability provided by the catalyst material. On the other hand, if $A_1 \geq 88\%$ by weight, the NOx adsorbing capability of the cerium oxide ($CeO_2$) is decreased and hence, the NOx percent conversion is likewise lowered.

This producing process makes it possible to mass-produce a catalyst having characteristics as described above. However, if the heating temperature T in the thermal treatment is lower than 800° C., it is failed to smoothly advance the phase conversion of the γ-phase and/or the η-phase into the α-phase. On the other hand, if T>1,100° C., it is difficult to control the upper limit value (R=98%) of the α-conversion rate R.

DESCRIPTION OF THE PREFERRED EMBODIMENTS

1. First exhaust emission control catalyst This catalyst is formed from a modified alumina and a catalytic metal carried in the mixed-phase alumina.

The modified alumina has a θ phase and an α phase, wherein the α-conversion rate R is set in a range of $0.5\% \leq R \leq 95\%$. The catalytic metal which may be used is at least one element selected from the platinum group, i.e., Ru, Rh, Pd, Ir and Pt. In this embodiment, Pt is used.

The measurement of the α-conversion rate R was carried out in a following manner.

(a) Commercially available α-alumina and γ-alumina (active alumina) were mixed at a predetermined ratio by weight, and the mixture was blended while being pulverized for 30 minutes in a mortar. Table 1 shows the composition of each of the mixtures (1) to (5).

TABLE 1

| Mixture No. | Composition (% by weight) | |
| --- | --- | --- |
| | α-alumina | γ-alumina |
| (1) | 0 | 100 |
| (2) | 25 | 75 |
| (3) | 50 | 50 |
| (4) | 75 | 25 |
| (5) | 100 | 0 |

(b) Each of the mixtures (2) to (5) were subjected to a powder X-ray diffraction to measure an intensity of X-ray reflected from a {113} face of the α-alumina appearing at 2 θ=43.4±0.2 in a CuK α line.

Figure 1:
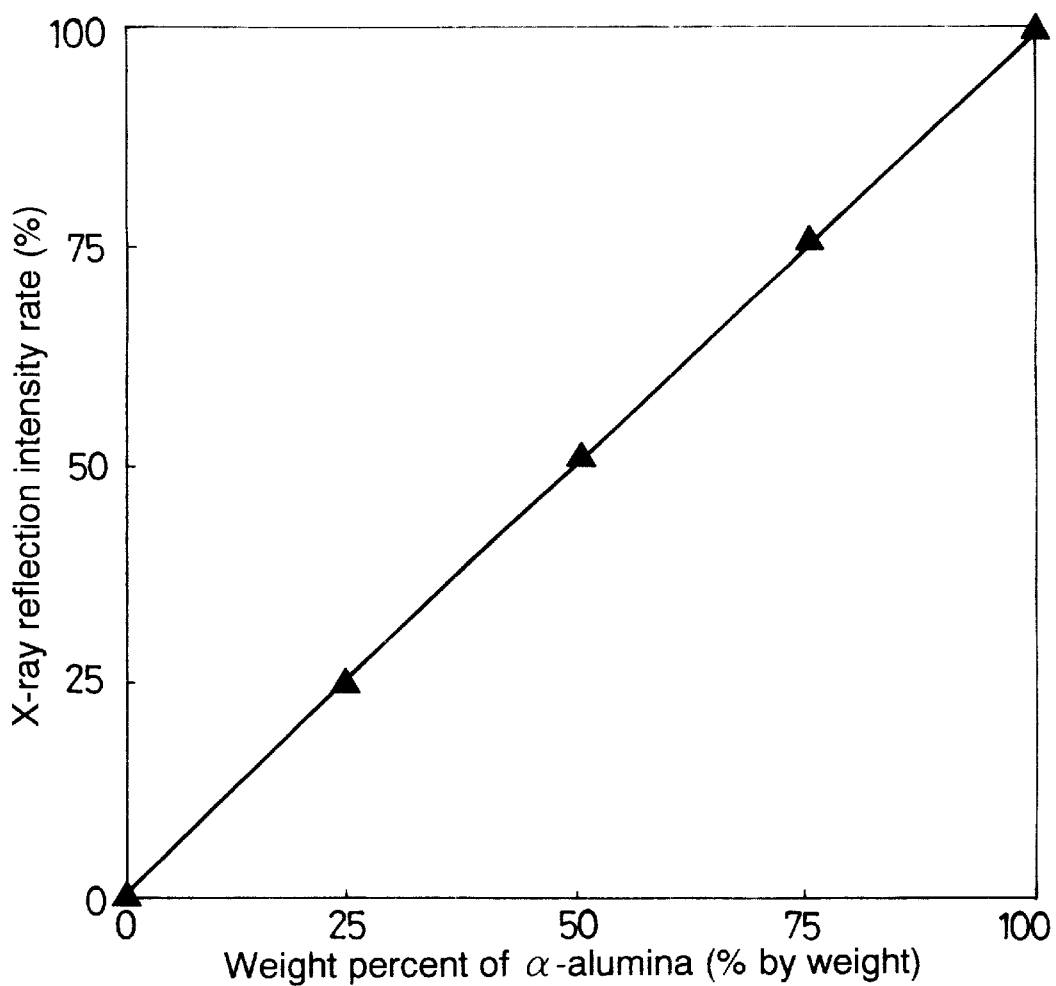
FIG. 1 is a graph illustrating the relationship between the weight percent of an α-alumina and the X-ray reflection intensity rate.

(c) A percent intensity of X-ray reflected for each of the mixtures (2) to (4) was determined based on the intensity of X-ray reflected for the mixture (5) defined at 100%, thereby determining the relationship between the weight percent (the weight rate) of the α-alumina and the percent intensity of X-ray reflected to provide results shown in FIG. 1.

As apparent from FIG. 1, the weight percent of the α-alumina and the percent intensity of X-ray reflected are in a direct proportional relation to each other. Therefore, in determining the α-conversion rate R of the modified alumina with the weight percent of the α-alumina defined as the α-conversion rate R, the intensity of X-ray reflected from the {113} face of the α-alumina in the modified alumina is measured to determine a percent intensity of X-ray reflected from the intensity of X-ray reflected for the mixture (5), and the α-conversion rate R is determined based on the percent intensity of X-ray reflected in FIG. 1.

In producing the catalyst, the following two processes may be used. A first process includes a step of subjecting an active alumina such as γ-, η-, δ- and θ-alumina to a thermal treatment with a heating temperature T set in a range of $800° C. \leq T \leq 1100° C.$, preferably, $900° C. \leq T \leq 1050° C.$, a step of phase-converting the active alumina into a modified alumina having an α-conversion rate R in a range of $0.5\% \leq R \leq 95\%$, and a step of carrying a catalytic metal Pt onto the modified alumina.

A second process includes a step of carrying a catalytic metal Pt onto an active alumina basically similar to the above-described active alumina, and a step of subjecting the active alumina having Pt carried thereon to a thermal treatment with a heating temperature T set in a range of $800° C. \leq T \leq 1100° C.$, preferably, $900° C. \leq T \leq 1050° C.$ to phase-convert the active alumina into a modified alumina having a θ-phase and an α-phase with an α-conversion rate R in a range of $0.5\% \leq R \leq 95\%$.

In the step of carrying Pt in each of the first and second processes, the concentration of Pt in a chloroplatinic acid solution is adjusted, so that the amount of Pt carried is in a range of 0.5±0.2% by weight.

Particular embodiments of the catalyst and the process for producing the same will be described below.

First Embodiment (a) An active alumina (γ-alumina) was subjected to a thermal treatment with a heating temperature T set at 1000° C. and with a heating time t set at 2 hours using an electric furnace to form a modified alumina by a phase-conversion of the active alumina.

(b) The modified alumina was subjected to a wet pulverizing treatment using a ball mill to provide a slurry of the modified alumina.

(c) The modified alumina slurry was evaporated to dryness at 150° C. and then to a firing at 600° C. for one hour using an electric furnace to provide a massive modified alumina.

(d) The massive modified alumina was subjected to a pulverizing treatment and then to a screening to provide a pellet-shaped modified alumina having a particle size of 1.4 to 3.4 mm.

(e) The pellet-shaped modified alumina was immersed into 37.3 g of a chloroplatinic acid solution (having a Pt concentration of 0.70%) for 12 hours.

(f) The pellet-shaped modified alumina was filtered, and the resulting modified alumina was subjected to a drying at 80° C. for 5 hours and then to a firing at 600° C. for one hour using an electric furnace to decompose the chloroplatinic acid, thereby producing a catalyst with Pt carried on the modified alumina. This catalyst is called an example 1.

Second Embodiment

An active alumina was subjected to a thermal treatment with a heating temperature T set at 1000° C. and with a heating time t set at 5 hours using an electric furnace to provide a modified alumina by a phase conversion of the active alumina, as in the first embodiment. Thereafter, the steps (b) to (f) described in the first embodiment were carried out to produce a catalyst with Pt carried in the modified alumina. This catalyst is called an example 2.

Third Embodiment (a) An active alumina was subjected to a wet pulverizing treatment using ball mill to provide an active alumina slurry, as in the first embodiment.

(b) The active alumina was evaporated to dryness at 150° C. and then to a firing at 600° C. for one hour using an electric furnace to provide a massive active alumina.

(c) The massive alumina was subjected to a pulverizing treatment and then to a screening to provide a pellet-shaped active alumina having a particle size of 1.4 to 3.4 mm.

(d) 25 g of the pellet-shaped active alumina was immersed in 37.3 g of a chloroplatinic acid solution (having a Pt concentration of 0.70%) for 12 hours.

(e) The pellet-shaped active alumina was filtered, and the resulting active alumina was subjected to a drying at 80° C. for 5 hours and then to a firing at 600° C. for one hour using an electric furnace to decompose the chloroplatinic acid, thereby producing a catalyst material with Pt carried in the active alumina.

(f) The catalyst material was subjected to a thermal treatment with a heating temperature T set at 1000° C. and with a heating time t set at 2 hours using an electric furnace to phase-convert the active alumina into a modified alumina, thereby producing a catalyst with Pt carried in the modified alumina. This catalyst is called an example 3.

Comparative Example I (a) The steps (a) to (c) described in the third embodiment were carried out to provide a pellet-shaped active alumina.

(b) The pellet-shaped active alumina was immersed in an amount of 25 g into 39.0 g of a chloroplatinic acid solution (having a Pt concentration of 0.45%) for 12 hours.

(c) The pellet-shaped active alumina was filtered, and the resulting active alumina was subjected to a drying at 80° C. for 5 hours and then to a firing at 600° C. for one hour using an electric furnace to decompose the chloroplatinic acid, thereby producing a catalyst with Pt carried in the active alumina. This catalyst was called an example 1a.

Figure 2:
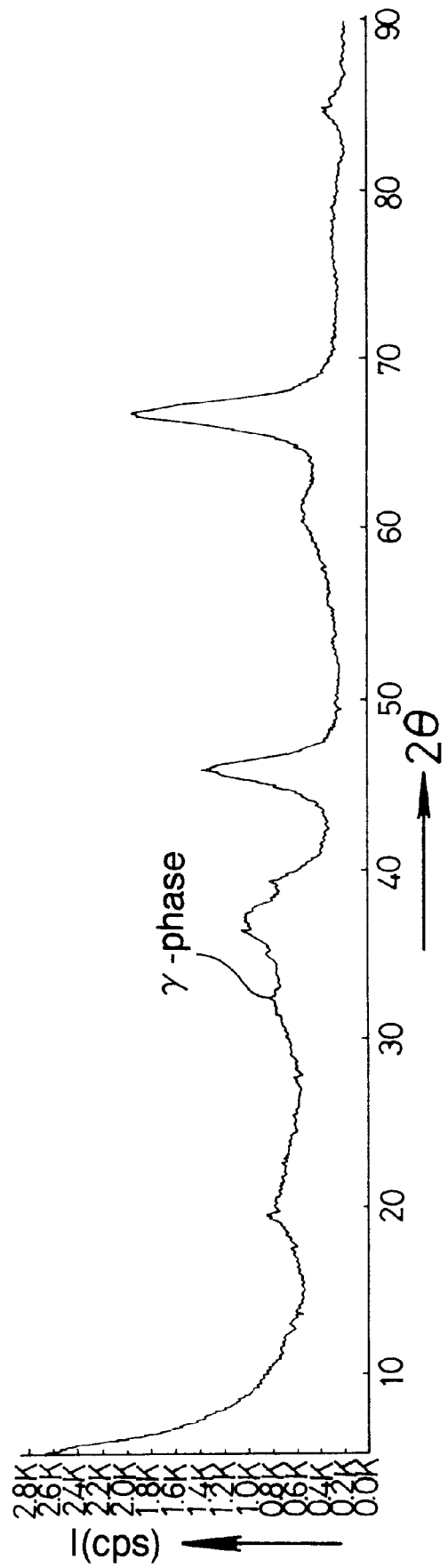
FIG. 2 is a powder X-ray diffraction pattern for an active alumina.

FIG. 2 shows a result of the powder X-ray diffraction for the active alumina used in the first to third embodiments and the comparative example I. In FIG. 2, a peak indicative of a γ-phase is observed.

Figure 3:
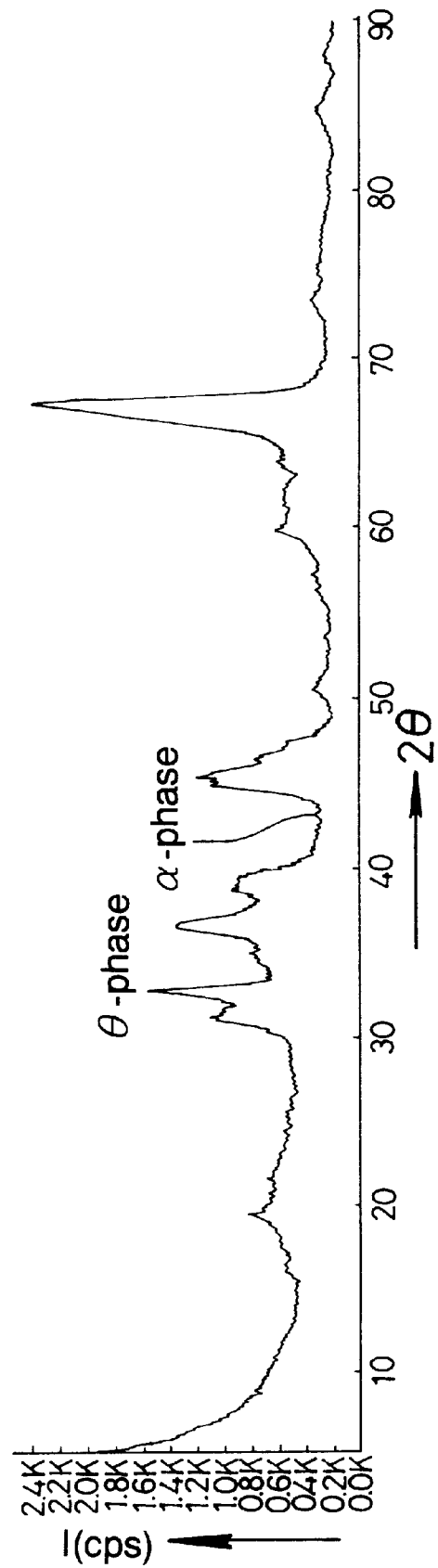
FIG. 3 is a powder X-ray diffraction pattern for one example of a modified alumina.
Figure 4:
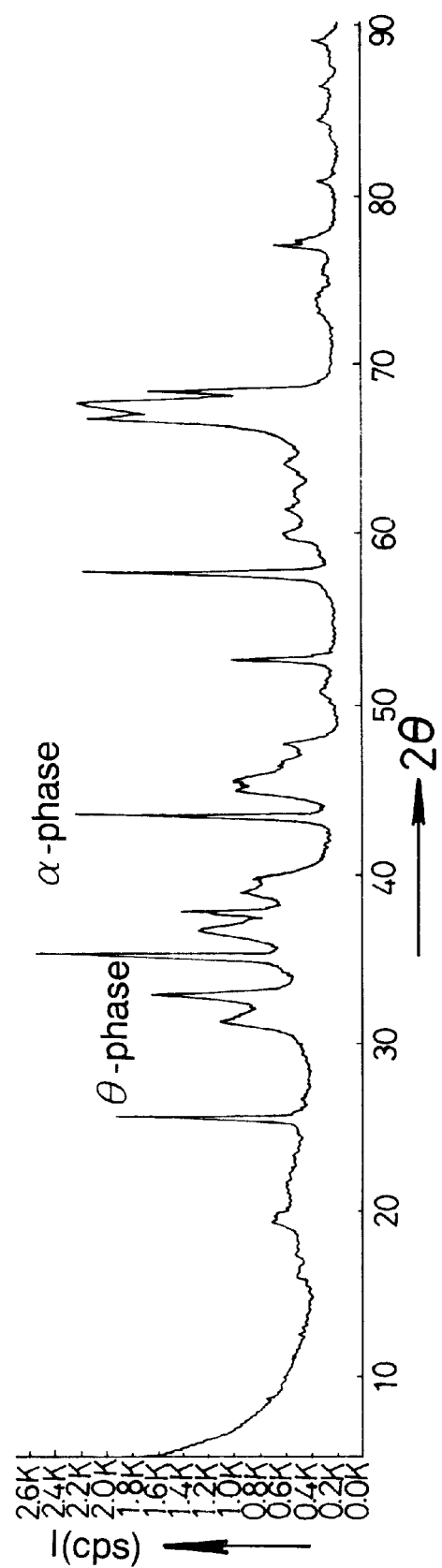
FIG. 4 is a powder X-ray diffraction pattern for another example of a modified alumina.

FIGS. 3 and 4 show results of the powder X-ray diffraction for the modified alumina in the first and second embodiments. In FIGS. 3 and 4, peaks indicative of θ- and α-phases are observed. The intensity of X-ray reflected for the α-phase in FIG. 4 is higher than that in FIG. 3. This is due to the fact that an α-conversion has advanced, because the heating time in the thermal treatment in the second embodiment is longer than that in the first embodiment.

Table 2 shows the α-conversion rate R of the modified alumina or the active alumina, the BET specific surface area and the amount of Pt carried in the examples 1 to 3 and 1a of the catalysts.

TABLE 2

| Catalyst | Modified, active alumina | | |
| --- | --- | --- | --- |
| | α-conversion rate R (%) | BET specific surface area ($m^2/g$) | Amount of Pt carried (% by weight) |
| Example 1 | 0.5 | 136 | 0.42 |
| Example 2 | 5.3 | 97 | 0.65 |
| Example 3 | 7 | 89 | 0.63 |
| Example 1a | 0 | 277 | 0.68 |

In order to carry out an NO conversion test for the examples 1 to 3 and 1a of the catalysts, a gas including 10% of $H_2O$, 1200 ppm of $C_3H_6$, 1000 ppm of CO, 1200 ppm of NO, 500 ppm of $H_2$, 10% of $CO_2$, 10% of $O_2$, all by weight and the balance of $N_2$ was prepared as a test gas.

The NO conversion test was carried out by forcing the test gas to flow at a flow rate of 10000 ml/min through an ambient-pressure fixed-bed reaction pipe with 20 g of a catalyst packed therein, and rising the temperature of the test gas from ambient temperature to 400° C. at 15° C./min, a measuring the NO conversion rate during that time.

Figure 5:
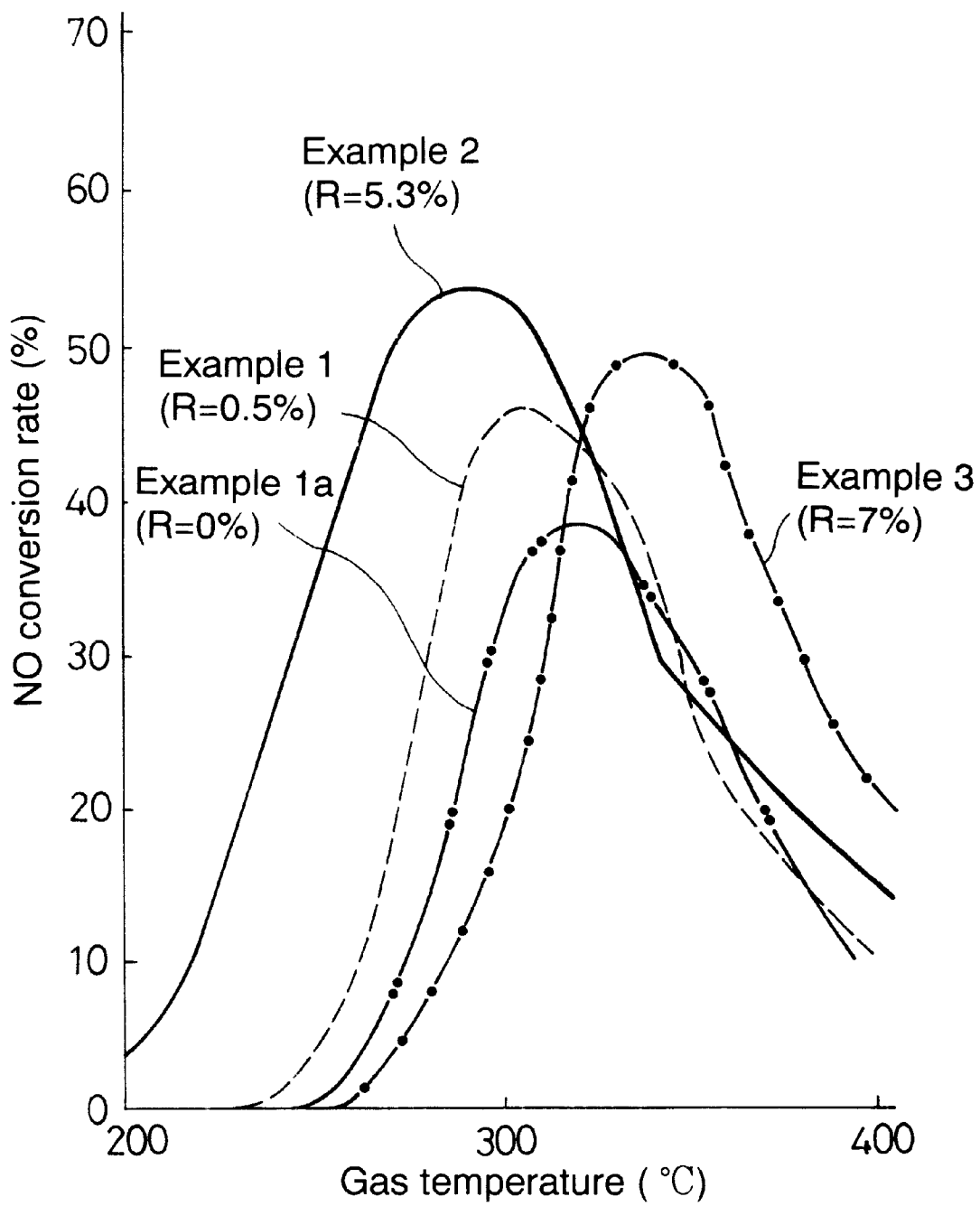
FIG. 5 is a graph illustrating the relationship between the gas temperature and the NO percent conversion.

FIG. 5 shows results of the NO conversion test. It can be seen from FIG. 5 that the examples 1 to 3 of the catalysts show a high NO conversion and have an extended converting temperature range, as compared with the example 1a. Particularly, the examples 1 and 2 have their NO converting capabilities shifted toward a lower gas-temperature side, as compared with the example 1a.

If the examples 1 and 2 of the catalysts are compared with each other, the example 2 using the modified alumina having a higher α-conversion rate R shows a higher NO conversion than the example 1, and its maximum value is shifted toward a lower temperature side.

In the case of the example 3 of the catalyst, the NO conversion is decreased, as compared with the example 1, because Pt is highly dispersed, as compared with the example 1, due to the fact that the phase conversion of the active alumina is carried out after carrying of Pt.

Fourth Embodiment

Using an active alumina similar to that in the first embodiment, various catalysts were produced in the same manner as in the first embodiment, except that the heating time t in the thermal treatment was varied. However, the α-conversion rate R of the modified alumina is increased with an increase in heating time t and for this reason, when the chloroplatinic acid solution of the same Pt concentration is used, the amount of Pt carried is decreased. Therefore, in order to maintain the amount of Pt carried at 0.5±0.2% by weight, the concentration of Pt in the chloroplatinic acid solution was increased with an increase in α-conversion of the modified alumina.

Table 3 shows the heating temperature T and the heating time t in the thermal treatment, the α-conversion rate R and the BET specific surface area of the modified alumina, and the amount of Pt carried in the modified alumina. It was confirmed in the powder X-ray diffraction for determining the α-conversion rate R that each modified alumina had θ- and α-phases.

TABLE 3

| Catalyst No. | Thermal treatment conditions | | α-convertion rate R (%) | BET specific surface area (m²/h) | Amount of Pt carried (% by weight) |
| --- | --- | --- | --- | --- | --- |
| | Heating temperature (°C.) | Heating time (hr) | | | |
| Example 4 | 1000 | 10 | 25 | 74 | 0.57 |
| Example 5 | 1000 | 20 | 45 | 59 | 0.63 |
| Example 6 | 1000 | 30 | 75 | 44 | 0.58 |
| Example 7 | 1000 | 50 | 90 | 37 | 0.51 |

Second Comparative Example (a) A commercially available α-alumina and an active alumina similar to that in Example 1 were mixed at a predetermined ratio to produce various alumina.

Table 4 shows compositions of the alumina mixtures (1) to (6).

TABLE 4

| Alumina mixture | Composition (% by weight) | |
| --- | --- | --- |
| | α-alumina | Active alumina |
| (1) | 20 | 80 |
| (2) | 35 | 65 |
| (3) | 50 | 50 |
| (4) | 70 | 30 |
| (5) | 90 | 10 |
| (6) | 100 | 0 | hereafter, the steps (b) to (f). described in the first embodiment were carried out to produce various catalysts with Pt carried in the alumina mixtures. However, in carrying Pt, the concentration of Pt in the chloroplatinic acid solution was adjusted as in the fourth embodiment. These catalysts called examples 2a to 7a in correspondence to the mixtures (1) to (6). The α-conversion rates R in the examples 2a to 7a are regarded as being 20, 35, 50, 70, 90 and 100% in correspondence to the amount of α-alumina, respectively.

The NO conversion test similar to that described above was carried out for the examples 4 to 7 and the examples 2a to 7a of the catalysts to determine the relationship between the α-conversion rates R and the maximum NO conversion for the modified alumina and the like, thereby providing results given in Table 5. The maximum NO conversions for the examples 1 to 3 and 1a of the catalysts are also given in Table 5.

TABLE 5

| Catalyst No. | α-conversion rate R (%) | Maximum NO conversion rate |
| --- | --- | --- |
| Example 1 | 0.5 | 46.2 |
| Example 2 | 5.3 | 54 |
| Example 3 | 7 | 50 |
| Example 4 | 25 | 53.4 |
| Example 5 | 45 | 54.6 |
| Example 6 | 75 | 54.1 |
| Example 7 | 90 | 51 |
| Example 1a | 0 | 39 |
| Example 2a | 20 | 40.2 |
| Example 3a | 35 | 41.4 |
| Example 4a | 50 | 40.8 |
| Example 5a | 70 | 40.8 |

TABLE 5-continued

| Catalyst No. | α-conversion rate R (%) | Maximum NO conversion rate |
| --- | --- | --- |
| Example 6a | 90 | 37.2 |
| Example 7a | 100 | 24 |

Figure 6:
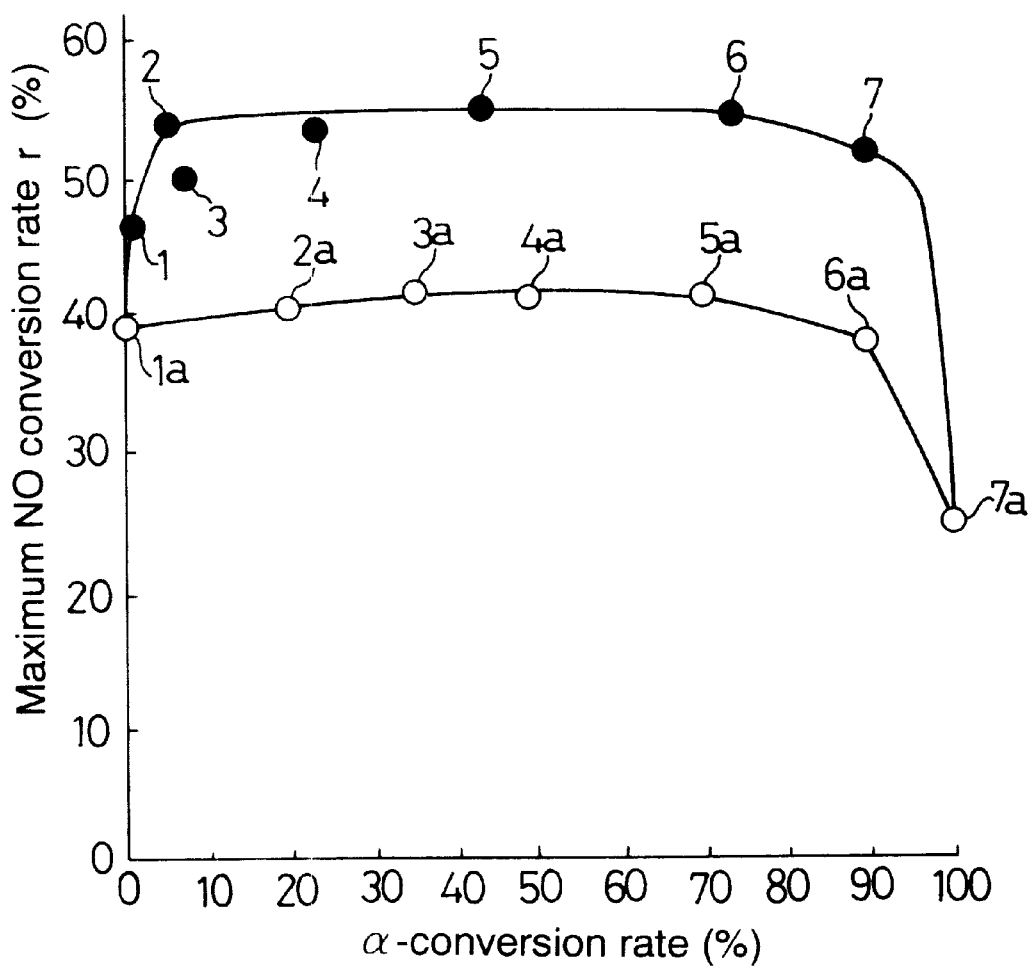
FIG. 6 is a graph illustrating the relationship between the α-conversion rate R and the maximum NO percent conversion.

FIG. 6 is a graph illustrating the relationship between the α-conversion R and the maximum NO conversion given in Table 5. In FIG. 5, points 1 to 7 and 1a to 7a correspond to the examples 1 to 7 and 1a to 7a, respectively.

As apparent from Table 5 and FIG. 6, each of the examples 1 to 7 of the catalysts according to the embodiment of the present invention exhibits a high maximum NO conversion, as compared with the examples 1a to 7a in Comparative Example II. This is due to the fact that the modified alumina in each of the examples 1 to 7 has the θ- and α-phases, and the α-conversion rate R in each of the examples 1 to 7 is set in a range of $0.5\% \leq R \leq 95\%$. In each of the examples 1a to 6a, the maximum NO conversion is low due to the use of the active alumina having a γ-phase is used, and the same is true in the example 7a due to the fact that it includes only the α-alumina.

II. Second Exhaust Emission Control Catalyst

This catalyst is a mixture of a catalyst material and a solid acidic aluminosilicate having a molecular sieves property. The catalyst material includes an alumina and a catalytic metal carried in the alumina.

The alumina used is a modified alumina having an α-phase, and the catalytic metal used is at least one element selected from the platinum group, i.e., Ru, Rh, Pd, Ir and Pt. In this embodiment, Pt is used. Further, the aluminosilicate used is a modified ZSM-5 zeolite produced by the dealuminization of an unmodified zeolite, e.g., an unmodified ZSM-5 zeolite in this embodiment.

The α-conversion rate R of the modified alumina is set in a range of $0.1\% \leq R \leq 95\%$, preferably, in range of $45\% \leq R \leq 90\%$. The measurement of the α-conversion rate R was carried out in the same manner as that described in the item I. The modified alumina was made in the same manner as that described in the item I.

If the α-conversion rate R is set in the above range, the specific surface area of the modified alumina is small, because it has the α-phase, as compared with that of the active alumina having the α-phase or the like. Therefore, if Pt is carried in this modified alumina, the dispersion of Pt is suppressed, as compared with the case where Pt is carried in the active alumina, and hence, the resulting catalyst exhibits a relatively weak oxidizing capability to a hydrocarbon (HC).

Thus, the hydrocarbon is partially oxidized to produce an active aldehyde (CHO) having an NOx reducing capability. The production of the aldehyde (CHO) is performed in a wider range of temperature of an exhaust gas, and the modified ZSM-5 zeolite adsorbs a portion of the active aldehyde to store it therein, and desorbs the portion of the active aldehyde to supply it. Therefore, NOx is reduced and converted by the active aldehyde, and the converting temperature range is widened.

Further, the modified alumina has the α-phase which is a stable phase and hence, the closing of fine pores in the active alumina resulting from the phase conversion, the embedding of Pt due to this closing and the like are difficult to occur. Thus, the modified alumina has an excellent heat resistance and is less in degree of degradation of the catalytic capability at a high temperature.

For the dealuminization of the unmodified ZSM-5 zeolite, at least one of an acid treatment, a steaming treatment and a boiling treatment may be utilized.

The acid treatment employs a process which involves heating a 0.5 to 5 N hydrochloric acid solution to 70 to 90° C. and throwing the modified ZSM-5 zeolite into the hydrochloric acid solution to agitate the resulting mixture for 1 to 20 hours.

The boiling treatment employs a process which involves subjecting the unmodified ZSM-5 zeolite to a hydrating, rising the temperature of the atmosphere around the modified ZSM-5 zeolite in the hydrated state to 550 to 600° C., and maintaining the unmodified ZSM-5 zeolite in the risen-temperature atmosphere for about 4 hours.

The steaming treatment employs a process which involves maintaining the unmodified ZSM-5 zeolite in an atmosphere containing about 10% of water and having a temperature of 750 to 900° C. for 10 to 20 hours.

The acid, boiling and steaming treatments may be utilized alone or in combination of two or more thereof, and if necessary, each of the treatments may be repeated. In this manner, a modified ZSM-5 zeolite is produced, and the molar ratio of $SiO_2/Al_2O_3$ thereof may be in a range of 25 to 800.

Such a modified ZSM5 zeolite has a hydrophobic nature increased depending upon the type of the dealuminization, and an increased adsorbing capability which is a characteristic, because it has a basic skeleton structure similar to that possessed by the unmodified ZSM5 zeolite and moreover, has a specific surface area increased by the removal of aluminum. Thus, the modified ZSM5 zeolite exhibits a good adsorbing capability to the hydrocarbon (HC) and the active aldehyde (CHO) even in the presence of water.

Further, the modified ZSM5 zeolite has a crystallizability enhanced by the dealuminization, and the generation of nucleus of a pyrolysis product is inhibited. Therefore, the heat-resisting temperature of the modified ZSM5 zeolite is increased to about 1,000° C.

In order to enhance the conversion of NOx by the catalyst, the weight percent $A_1$ $(=\{A/(A+B)\}\times100)$ of the catalyst material is set in a range of 11% by weight $\leq A_1 <$ 95% by weight, wherein A represents the weight of catalyst material incorporated, and B represents the weight of modified ZSM5 zeolite incorporated.

Likewise, in order to enhance the conversion of NOx by the catalyst, the weight percent $a_1$ $(=\{a/(a+b)\}\times100)$ of Pt is set in a range of 0.1% by weight $< a_1 \leq$ 5% by weight, wherein a represents the weight of Pt incorporated, and b represents the weight of modified alumina incorporated.

In producing the catalyst, basically, following steps are carried out sequentially: a step of subjecting an active alumina such as a γ-alummina to a thermal treatment with a heating temperature T set in a range of 800° C. $\leq$ T $\leq$ 1,100° C., preferably 900° C. $\leq$ T $\leq$ 1,050° C. to produce a modified alumina having an α-phase and having an α-conversion rate R in a range of 0.1% $\leq$ R $\leq$ 95% from the active alumina, a step carrying platinum (Pt) into the modified alumina to provide a catalyst material, and a step of mixing the catalyst material with a modified ZSM5 zeolite.

In this case, after the platinum has been carried in the modified zeolite, a thermal treatment similar to that described above may be carried out to produce a modified alumina from the active alumina. The form of the catalyst is not limited to the mixture, and may be formed into a laminated structure having a layer formed of the catalyst material, and a layer formed of the modified ZSM5 zeolite.

The carrying of Pt in the modified alumina or the active alumina is performed by immersing the modified alumina Ir the like into a hexachloro platinic acid ($H_2PtCl_6$) solution. In this case, the concentration of Pt in the hexachloro platinic acid solution is adjusted so that the weight percent $a_1$ of Pt is in a range of 0.1% by weight $< a_1 \leq$ 5% by weight. The platinum compounds which may be used are various Pt-containing compounds including $Pt(NH_3)_2(NO_2)_2$ and the like.

Particular embodiments will be described below.

Production of Modified Alumina

A commercially available active alumina (γ-alumina having α-conversion rate of 0%) was subjected to a thermal treatment at varied heating temperatures T for varied heating times t in the atmosphere to produce various modified alumina having different α-conversion rates.

Table 6 shows the thermal treatment conditions and the α-conversion rates R for examples 1 to 11 of the modified alumina.

TABLE 6

| Modified alumina | Thermal treatment conditions | | α-conversion rate R (%) |
| --- | --- | --- | --- |
| | Heating temperature (°C.) | Heating time (hr) | |
| Example 1 | 900 | 3 | 0.1 |
| Example 2 | 900 | 10 | 0.2 |
| Example 3 | 1000 | 4 | 3 |
| Example 4 | 1000 | 7 | 5 |
| Example 5 | 1000 | 10 | 7 |
| Example 6 | 1000 | 20 | 29 |
| Example 7 | 1000 | 25 | 51 |
| Example 8 | 1000 | 30 | 64 |
| Example 9 | 1000 | 70 | 81 |
| Example 10 | 1000 | 100 | 89 |
| Example 11 | 1000 | 150 | 95 |

Production of Modified ZSM5 Zeolite (a) An Na-type unmodified ZSM5 zeolite having a molar ratio of $SiO_2/Al_2O_3$ equal to 33.7 was placed in an amount of 500 into a 5 N hydrochloric acid solution of 90 (° C.) and then, the mixture was agitated for 20 hours to provide a slurry.

(b) Solids were filtered off from the slurry and washed with a 20-times amount of pure water.

(c) The solids were dried in the atmosphere at 100° C. for 5 hours and then, the dried solids were subjected to a firing in the atmosphere at 400° C. for 12 hours to produce a massive modified ZSM5 zeolite.

(d) The massive modified ZSM5 zeolite was subjected to a pulverization to provide a powdered modified ZSM5 zeolite. This modified ZSM5 zeolite had a molar ratio of $SiO_2/Al_2O_3$ of 41.3 and hence, it can be seen that the dealuminization occurred. the heat-resisting temperature of the modified ZSM5 zeolite was of 1,000° C.

First Embodiment

Production of Catalyst (a) The example 9 in Table 6, i.e., a modified alumina having an α-conversion rate R of 81% was placed in an amount of 98.5 g into 21.4 g of a hexachloro platinic acid solution (having a Pt concentration of 7.0%), and the resulting mixture was blended sufficiently. Then, solids were filtered off and subjected to a drying at 120° C. for one hour and then to a firing in the atmosphere at 600° C. for one hour to produce a catalyst material having a weight percent $a_1$ of Pt equal to 1.5% by weight.

(b) 90 g of the catalyst material, 90 g of a modified ZSM-5 zeolite, 100 g of 20% silica sol, 240 g of ethanol and alumina balls were thrown into a pot. The resulting mixture was subjected to a wet pulverization for 12 hours to prepare a slurry-like catalyst. In this case, the weight percent $A_1$ of the catalyst material was equal to 50% by weight.

A cordierite honeycomb support having a diameter of 25.5 mm and a length of 60 mm and having 300 cells of 10.5 mil was immersed into the slurry-like catalyst and then picked up from the slurry-like catalyst. An excessive amount of the catalyst was removed from the honeycomb support by injection of air. Thereafter, the honeycomb support was maintained under heating at 120° C. to dry the slurry-like catalyst, and further subjected to a firing in the atmosphere at 600° C. for one hour to retain the catalyst in the honeycomb support. In this case, the amount of catalyst carried in the honeycomb support was of 150 g/liter. This catalyst is called an example 1.

For comparison, a slurry-like catalyst was prepared in the same manner, except that a commercially available active alumina similar to that described above was used as an alumina. This slurry-like catalyst and a honeycomb support similar to that described above were used, and the catalyst was retained in the honeycomb support in the same manner as described above. In this case, the amount of catalyst retained in the honeycomb support was equal to the above-described amount and is called a comparative example 1.

Exhaust Gas-Assumed Purifying Test

Assuming an exhaust gas corresponding to a theoretic air-fuel ratio A/F of 14.6 and an air-fuel ratio A/F of 24.3 in an atmosphere containing an excessive amount of air, two types of first and second test gases having compositions shown in Table 7 were prepared.

TABLE 7

| Constituent | First test gas (A/F = 14.6) (% by volume) | Second test gas (A/F = 24.3) (% by volume) |
|---|---|---|
| $CO_2$ | 14.0 | 10.0 |
| $H_2$ | 0.17 | 0.05 |
| $C_3H_6$ | 0.12 | 0.24 |
| NO | 0.05 | 0.12 |
| CO | 0.05 | 0.10 |
| $O_2$ | 0.5 | 10.0 |
| $H_2O$ | 10.0 | 10.0 |
| $N_2$ | balance | balance |

In the purifying test, first, the catalyst of the example 1 was placed in a fixed-bed flow type reactor apparatus. Then, the first test gas was supplied to flow through the apparatus at a space velocity S.V. of $5 \times 10^4$ $h^{-1}$, wherein the temperature of the first test gas was risen from ambient temperature at 20° C./min, and the percent conversions of hydrocarbon (HC), carbon monoxide (CO) and nitrogen monoxide (NO) were measured at a predetermined temperature. The second test gas was also used to measure the conversion of hydrocarbon (HC) and the like in the same manner. Further, a similar purifying test was carried out even with the catalyst of the comparative example 1.

Table 8 shows conditions for and results of the measurement.

TABLE 8

| Catalyst | α-conversion rate R of modified alumina (%) | Air-fuel ratio A/F | Measuring temperature of gas (° C.) | Conversion rate (%) | | |
|---|---|---|---|---|---|---|
| | | | | HC | CO | NO |
| Example 1 | 81 | 14.6 | 450 | 97 | 98 | 91 |
| Comparative example 1 | 0 | | | 98 | 98 | 64 |
| Example 1 | 81 | 24.3 | 300 | 99 | 97 | 27 |
| Comparative example 1 | 0 | | | 98 | 95 | 14 |

As apparent from Table 8, the catalyst of the example 1 exhibits a higher percent conversion of hydrocarbon and the like. Particularly, the percent conversion of nitrogen monoxide in the atmosphere containing an excessive amount of air with an air-fuel ratio A/F equal to 24.3 is about two times that provided in the comparative example 1. This is due to a difference in physical properties between the modified alumina having the α-conversion rate equal to 81% and the active alumina having the α-conversion rate equal to 0.

Second Embodiment

Various catalysts were produced in the same manner as in the first embodiment. In this case, the total amount of catalyst material and modified ZSM5 zeolite incorporated was determined at 180 g as in the first embodiment.

Table 9 shows the α-conversion rate R of the modified alumina, the composition, the maximum NO conversion rate r and the gas temperature at which such percent conversion r was obtained, for the catalysts of examples 1 to 6 and comparative examples 1 and 2.

In these catalysts, the weight percent $a_1$ of Pt is equal to 1.5% by weight (constant); the weight percent $A_1$ of the catalyst material is equal to 25% by weight (constant); and the α-conversion rate R of the modified alumina is varied.

The purifying test was carried out in the same manner as in the first embodiment, using a second test gas (A/F=24.3) similar to that used in the first embodiment. The same is true of other catalyst which will be described hereinafter.

r, and the gas temperature at which such maximum NO conversion rate r was obtained, for the catalysts of examples 15 to 19 and comparative examples 5 and 6.

In these catalysts, the weight percent $a_1$ of Pt is equal to 1.5% by weight (constant); the weight percent $A_1$ of the catalyst material is equal to 75% by weight (constant); and the α-conversion rate R of the modified alumina is varied.

TABLE 9

| Catalyst | α-conversion rate R of modified alumina (%) | Weight percent $a_1$ of Pt (% by weight) | Weight percent $A_1$ of catalyst material (% by weight) | Maximum NO conversion rate r (%) | Gas temperature (° C.) |
| --- | --- | --- | --- | --- | --- |
| Example 1 | 0.1 | 1.5 | 25 | 25 | 260 |
| Example 2 | 3 | 1.5 | 25 | 28 | 270 |
| Example 3 | 29 | 1.5 | 25 | 32 | 320 |
| Example 4 | 51 | 1.5 | 25 | 50 | 270 |
| Example 5 | 64 | 1.5 | 25 | 54 | 260 |
| Example 6 | 81 | 1.5 | 25 | 55 | 270 |
| Comparative example 1 | 0 | 1.5 | 25 | 22 | 270 |
| Comparative example 2 | 100 | 1.5 | 25 | 13 | 270 |

Table 10 shows the α-conversion rate R of the modified alumina, the composition, the maximum NO conversion rate r, and the gas temperature at which such maximum NO conversion rate r was obtained, for the catalysts of examples 7 to 14 and comparative examples 3 and 4.

In these catalysts, the weight percent $a_1$ of Pt is equal to 1.5% by weight (constant); the weight percent $A_1$ of the catalyst material is equal to 50% by weight (constant); and the α-conversion rate R of the modified alumina is varied.

TABLE 10

| Catalyst | α-conversion rate R of modified alumina (%) | Weight percent $a_1$ of Pt (% by weight) | Weight percent $A_1$ of catalyst material (% by weight) | Maximum NO conversion rate r (%) | Gas temperature (° C.) |
| --- | --- | --- | --- | --- | --- |
| Example 7 | 0.2 | 1.5 | 50 | 26 | 270 |
| Example 8 | 7 | 1.5 | 50 | 25 | 270 |
| Example 9 | 29 | 1.5 | 50 | 26 | 270 |
| Example 10 | 51 | 1.5 | 50 | 39 | 270 |
| Example 11 | 64 | 1.5 | 50 | 42 | 260 |
| Example 12 | 81 | 1.5 | 50 | 44 | 250 |
| Example 13 | 89 | 1.5 | 50 | 37 | 260 |
| Example 14 | 95 | 1.5 | 50 | 28 | 260 |
| Comparative example 3 | 0 | 1.5 | 50 | 22 | 280 |
| Comparative example 4 | 100 | 1.5 | 50 | 13 | 340 |

Table 11 shows the α-conversion rate R of the modified alumina, the composition, the maximum NO conversion rate

TABLE 11

| Catalyst | α-conversion rate R of modified alumina (%) | Weight percent $a_1$ of Pt (% by weight) | Weight percent $A_1$ of catalyst material (% by weight) | Maximum NO conversion rate r (%) | Gas temperature (° C.) |
| --- | --- | --- | --- | --- | --- |
| Example 15 | 5 | 1.5 | 75 | 23 | 250 |
| Example 16 | 29 | 1.5 | 75 | 25 | 260 |
| Example 17 | 51 | 1.5 | 75 | 35 | 260 |

TABLE 11-continued

| Catalyst | α-conversion rate R of modified alumina (%) | Weight percent a₁ of Pt (% by weight) | Weight percent A₁ of catalyst material (% by weight) | Maximum NO conversion rate r (%) | Gas temperature (° C.) |
| --- | --- | --- | --- | --- | --- |
| Example 18 | 64 | 1.5 | 75 | 38 | 260 |
| Example 19 | 81 | 1.5 | 75 | 38 | 250 |
| Comparative example 5 | 0 | 1.5 | 75 | 19 | 270 |
| Comparative example 6 | 100 | 1.5 | 75 | 13 | 350 |

Figure 7:
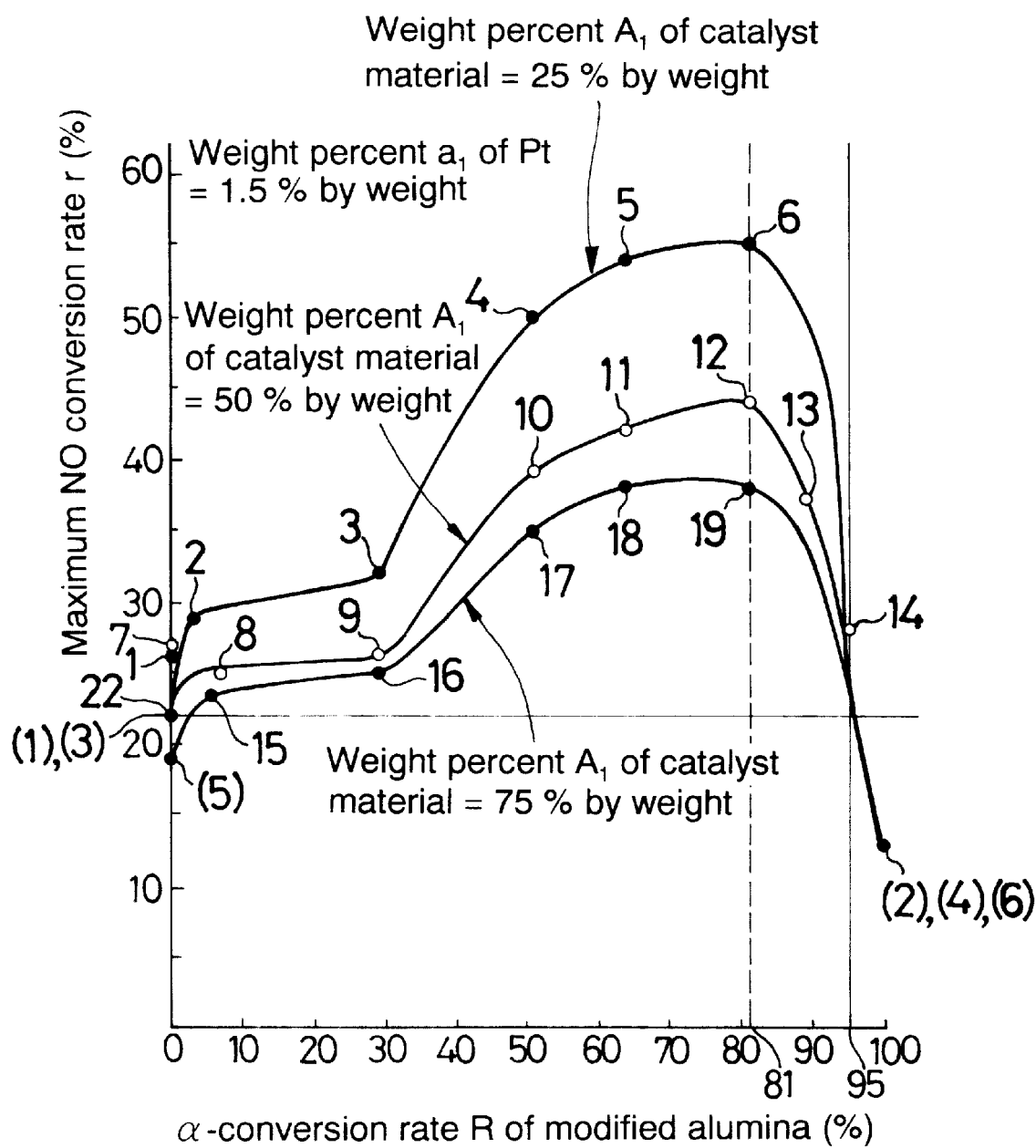
FIG. 7 is a graph illustrating the relationship between the α-conversion rate R of a modified alumina and the maximum NO conversion rate r.

FIG. 7 is a graph which illustrates the relationship between the α-C-conversion rate R and the maximum NO percent convertion r based on Tables 9 to 11. In FIG. 7, points 1 to 19 correspond to the examples 1 to 19, respectively, and points (1) to (6) correspond to the comparative examples 1 to 6, respectively.

As apparent from FIG. 7 and Tables 9 to 11, the alumina in each of the catalysts of the comparative examples 1, 3 and 5 is an active alumina having an α-conversion rate R of 0%. The alumina in each of the catalysts of the comparative examples 2, 4 and 6 is an α-alumina having an α-conversion rate R of 100%. In this case, the highest value of the maximum NO conversion rate r is 22% with the catalysts of the comparative examples 1 and 3. Therefore, it is possible to increase the maximum NO conversion rate r to a value greater than 22% in an atmosphere containing an excessive amount of air by setting the α-conversion rate R of the modified alumina in a range of $0.1\% \leq R \leq 95\%$, if the weight percent $A_1$ of the catalyst material is in a range of 11% by weight $\leq A_1 \leq 95\%$ by weight and the weight percent $a_1$ of Pt is in a range of 0.1% by weight $< a_1 \leq 5\%$ by weight, as in the catalysts of the examples 1 to 19. It can be seen from FIG. 7 that if the α-conversion rate R of the modified alumina is set in a range of $45\% \leq R \leq 90\%$, the maximum NO conversion rate r can be further increased to a level in a range of $32\% \leq r \leq 55\%$ and therefore, the preferable range of the α-conversion rate R of the modified alumina is of $45 \leq R \leq 90\%$.

Table 12 shows the α-conversion rate R of the modified alumina, the composition, the maximum NO conversion rate r, and the gas temperature at which such maximum NO conversion rate r was obtained, for the catalysts of examples 20 to 25 and comparative examples 7 and 8.

In these catalysts, the α-conversion rate R of the modified alumina is equal to 81% (constant); the weight percent $a_1$ of Pt is equal to 1.5% by weight (constant); and the Weight percent $A_1$ of the catalyst material is varied.

TABLE 12

| Catalyst | α-conversion rate R of modified alumina (%) | Weight percent a₁ of Pt (% by weight) | Weight percent A₁ of catalyst material (% by weight) | Maximum NO conversion rate r (%) | Gas temperature (° C.) |
| --- | --- | --- | --- | --- | --- |
| Example 20 | 81 | 1.5 | 12 | 36 | 280 |
| Example 21 | 81 | 1.5 | 15 | 48 | 260 |
| Example 22 | 81 | 1.5 | 35 | 51 | 270 |
| Example 23 | 81 | 1.5 | 60 | 40.5 | 260 |
| Example 24 | 81 | 1.5 | 80 | 36 | 260 |
| Example 25 | 81 | 1.5 | 90 | 29 | 250 |
| Comparative example 7 | 81 | 1.5 | 10 | 19 | 320 |
| Comparative example 8 | 81 | 1.5 | 95 | 22 | 250 |

Figure 8:
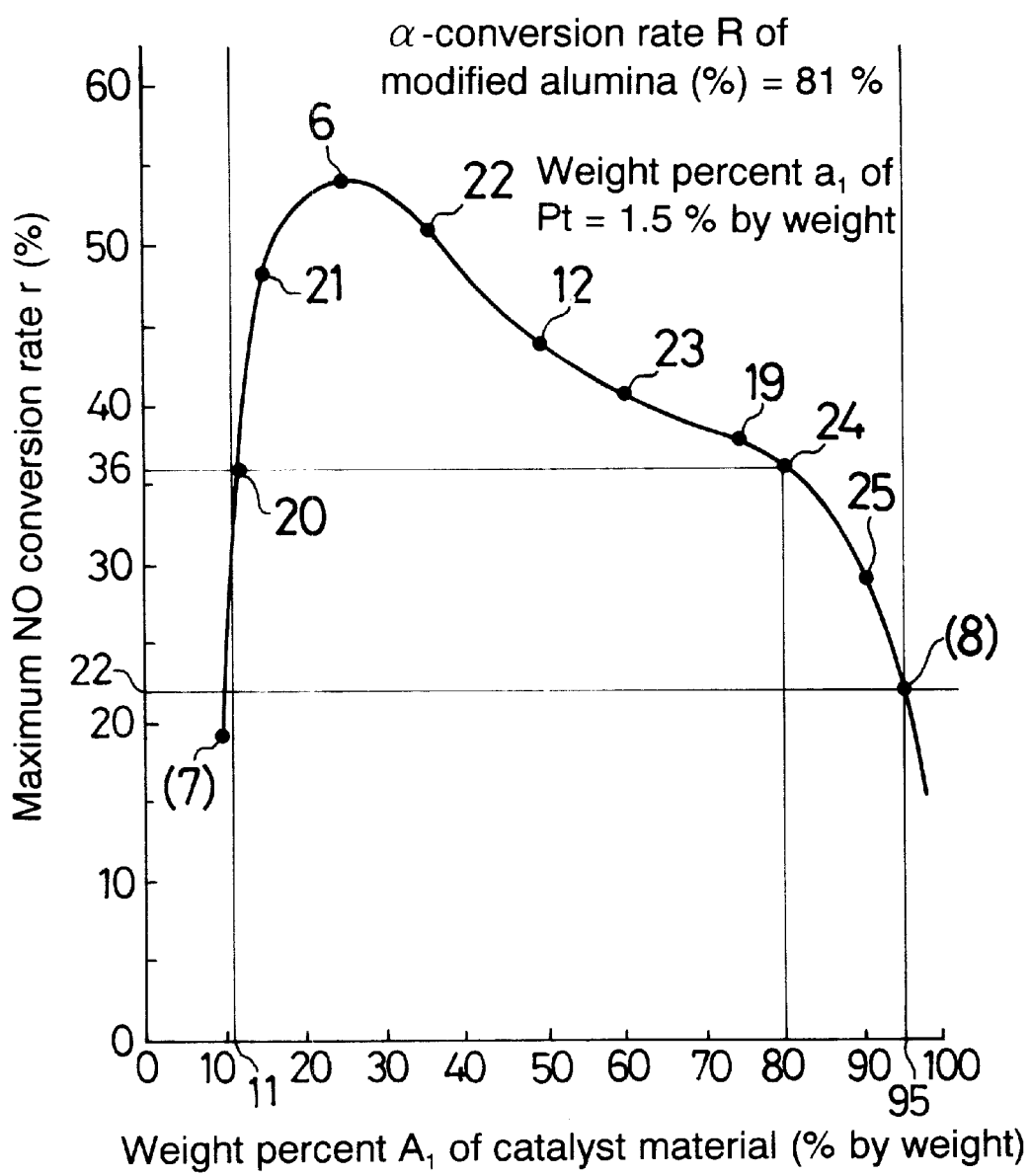
FIG. 8 is a graph illustrating the relationship between the weight percent $A_1$ of a catalyst material and the maximum NO conversion rate r.

FIG. 8 is a graph which illustrates, based on Tables 9 to 12, the relationship between the weight percent $A_1$ of the catalyst material and the maximum NO conversion rate r with the α-conversion rate R of the modified alumina equal to 81% and with the weight percent $a_1$ of Pt equal to 1.5% by weight. In FIG. 8, points 6, 12, 19, and 20 to 25 correspond to the examples 6, 12, 19, and 20 to 25, respectively, and point (7) and (8) correspond to the comparative examples 7 and 8.

As apparent from FIG. 8 and Table 12, the weight percent $A_1$ of the catalyst material in the catalyst of the comparative example 7 is equal to 10% by weight, and the weight percent $A_1$ of the catalyst material in the catalyst of the comparative example 8 is equal to 95% by weight. In this case, the highest value of the maximum NO conversion rate r is 22%. Therefore, it is possible to increase the maximum NO conversion rate r to a value greater than 22% in an atmosphere containing an excessive amount of air by setting the weight percent $A_1$ of the catalyst material in a range of 11% by weight $\leq A_1 < 95\%$ by weight, if the α-conversion rate R is in a range of $0.1\% \leq R \leq 95\%$ and the weight percent $a_1$ of Pt is in a range of 0.1% $< a_1 \leq 5\%$ by weight, as in the catalysts of the examples 6, 12, 19 and 20 to 25. It can be seen from FIG. 8 that if the weight percent $A_1$ of the catalyst material is set in a range of 12% $\leq A_1 \leq 80\%$ by weight, the maximum NO conversion rate r can be increased to a level equal to or greater than 36% and therefore, the preferable range of weight percent of the catalyst material is of 12%≦A₁≦80% by weight.

Table 13 shows the α-conversion rate R of the modified alumina, and the composition, the maximum NO conversion rate r, and the gas temperature at which such maximum NO conversion rate r was obtained, for the catalysts of examples 26 and 27 and a comparative example 9.

In these catalysts, the α-conversion rate R of the modified alumina is equal to 81% (constant); the Weight percent $A_1$ of the catalyst material is equal to 50% by weight (constant); and the weight percent $a_1$ of Pt is varied.

TABLE 13

| Catalyst | α-conversion rate R of modified alumina (%) | Weight percent $a_1$ of Pt (% by weight) | Weight percent $A_1$ of catalyst material (% by weight) | Maximum NO conversion rate r (%) | Gas temperature (° C.) |
|---|---|---|---|---|---|
| Example 26 | 81 | 0.5 | 50 | 37 | 270 |
| Example 27 | 81 | 3.0 | 50 | 39 | 270 |
| Comparative example 9 | 81 | 0.1 | 50 | 22 | 320 |

As apparent from Table 13, the weight percent $a_1$ of Pt in the catalyst of the comparative example 9 is equal to 0.1% by weight. In this case, the highest value of the maximum NO conversion rate r is 22%. Therefore, it is possible to increase the maximum NO conversion rate r to a value greater than 22% in an atmosphere containing an excessive amount of air by setting the weight percent $a_1$ of Pt in a range of 0.1% by weight<$a_1$≦5% by weight, if the α-conversion rate R of the modified alumina is in a range of 0.1%–R≦95% and the weight percent $a_1$ of the catalyst material is in a range of 11% by weight≦$A_1$<95% by weight, as in the catalysts of the examples 26 and 27.

III. Third Exhaust Emission Control Catalyst

This catalyst is a mixture of a catalyst material and a $CeO_2$ powder. The catalyst material is formed of an alumina and a catalytic metal carried in the alumina.

The alumina used is a modified alumina having an α-phase. The catalytic metal used is at least one element selected from the platinum group, i.e., Ru, Rh, Pd. Ir and Pt. In an atmosphere containing an excessive amount of oxygen (for example, an air-fuel ratio A/F≒24), Pt is preferred.

The α-conversion rate R of the modified alumina is set in a range of 1%≦R≦98%, preferably, 30%≦R≦95%. The measurement of the α-conversion rate R was carried out in the same manner as described in the item I. The modified alumina was produced in the same manner as described in the item I.

Table 14 shows the thermal treatment conditions and the α-conversion rate R for examples 1 to 11 of the modified alumina.

TABLE 14

| Modified alumina | Thermal treatment conditions | | α-conversion rate R (%) |
|---|---|---|---|
| | Heating temperature (°C.) | Heating time (hr) | |
| Example 1 | 900 | 3 | 0.1 |
| Example 2 | 1000 | 4 | 3 |
| Example 3 | 1000 | 7 | 5 |
| Example 4 | 1000 | 10 | 7 |
| Example 5 | 1000 | 20 | 29 |
| Example 6 | 1000 | 25 | 51 |
| Example 7 | 1000 | 30 | 64 |
| Example 8 | 1000 | 70 | 81 |

TABLE 14-continued

| Modified alumina | Thermal treatment conditions | | α-conversion rate R (%) |
|---|---|---|---|
| | Heating temperature (°C.) | Heating time (hr) | |
| Example 9 | 1000 | 100 | 89 |
| Example 10 | 1000 | 150 | 95 |
| Example 11 | 1000 | 200 | 98 |

Figure 9:
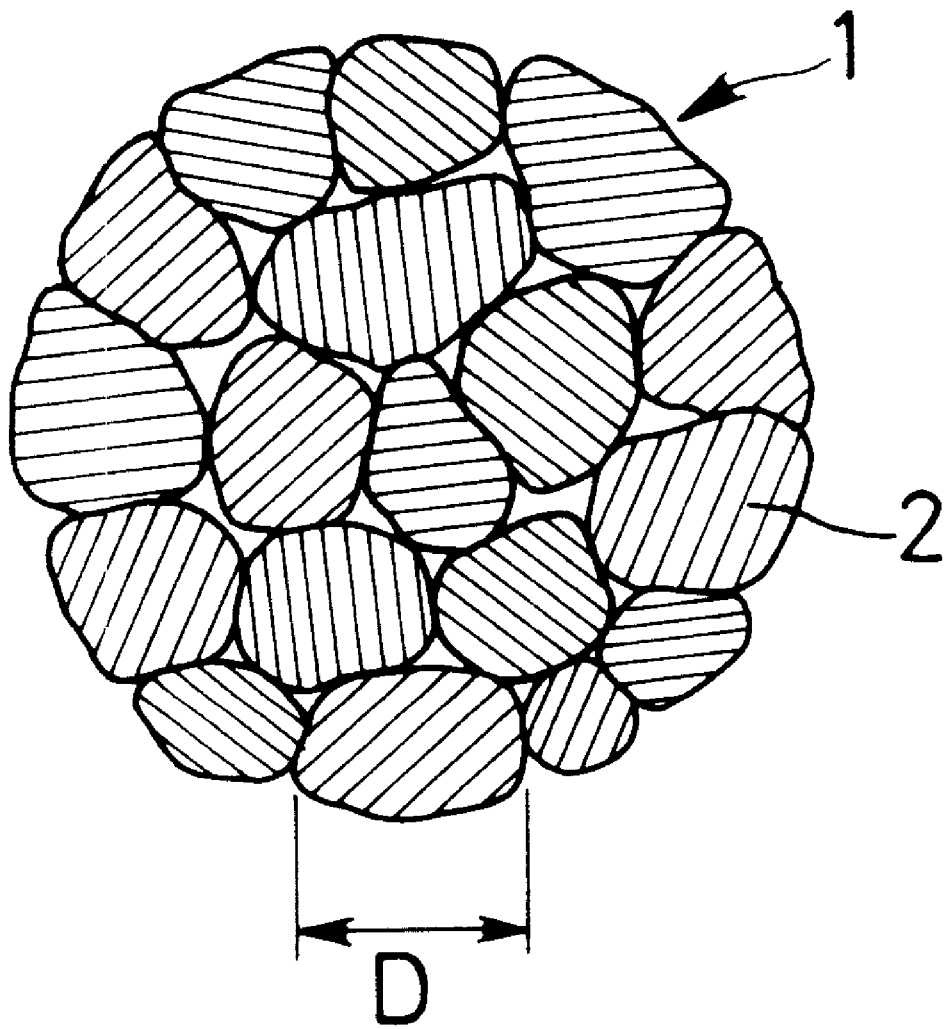
FIG. 9 is a diagram illustrating cerium oxide ($CeO_2$)

In FIG. 9, reference character 1 designates $CeO_2$ having an NOx adsorbing capability. The $CeO_2$ is in the form of a polycrystalline grain aggregate including a plurality of crystals 2. The average grain size D of the crystals is preferably set in a range of D<500 Å.

In producing cerium oxide ($CeO_2$), any of various cerium salts such as cerium carbonates, oxlates, nitrates and the like is heated in the presence of oxygen. If it is desired to provide pure cerium oxide ($CeO_2$) free of any of rare earth elements, the cerium oxide obtained after heating is cleaned with nitric acid.

The control of the average crystal grain size D is carried out by adjusting the heating temperature in the producing course. For obtaining cerium oxide ($CeO_2$) having an average crystal grain size D, for example, equal to 78 Å, cerium nitrate is heated to 180° C. The average crystal grain size D can also be controlled by subjecting the produced cerium oxide to a thermal treatment. For example, when cerium oxide ($CeO_2$) having an average crystal grain size D of 78 Å is subjected to a thermal treatment at 700° C. for 10 hours, cerium oxide having an average crystal grain size D of 123 Å.

In calculating the average grain size $D_{(hkl)}$, Scherrer expression, $D_{(hkl)} = 0.9 \lambda / (\beta_{1/2} \cdot \cos\theta)$ was used, wherein hkl is a Miller index; λ is a wavelength (Å) of a characteristic X-ray; $\beta_{1/2}$ is a half width (radian) of a (hkl) face; and θ is an X-ray reflection angle. Therefore, the average crystal grain size D is determined from a grain size $D_{(111)}$ of each of crystals calculated by measuring the half width $\beta_{1/2}$ of a face (111) from an X-ray diffraction pattern for cerium oxide ($CeO_2$).

In the catalyst, the weight percent $A_1$ (={A/(A+E)}×100) of the catalyst material is set in a range of 20% by weight<$A_1$<88% by weight in order to the increase the NOx percent conversion, wherein A represents the weight of catalyst material incorporated, and E represents the weight of $CeO_2$ incorporated.

Likewise, the weight percent $a_1$ (={a/(a+b)}×100) of the catalytic metal in the catalyst is set in a range of 0.1% by weight<$a_1$≦5% by weight in order to the increase the NOx percent conversion, wherein a represents the weight of catalytic metal incorporated, and b represents the weight of modified incorporated. In this case, if the weight percent $a_1$ is equal to less than 0.1% by weight, the NOx percent conversion is decreased by a reduction in catalytic capability. On the other hand, even if the weight percent $a_1$ is set at a value greater than 5% by weight, a NOx converting effect corresponding to an increase in amount of catalytic metal carried is not obtained.

In the production of the catalyst, a process is employed which involves carrying a catalytic metal in a modified alumina to produce a catalyst material and then mixing the catalyst material and cerium oxide ($CeO_2$).

In this case, a catalytic metal may be carried in an active alumina and then, the resulting catalyst material may be subjected to a thermal treatment similar to that described above, thereby producing a modified alumina from the active alumina. The form of the catalyst is not limited to the above-described mixture, and the catalyst may be formed into a laminated structure having a layer formed of a catalytic material and a layer formed of cerium oxide ($CeO_2$).

In carrying, for example, platinum (Pt) in the modified or active alumina, the modified or active alumina is immersed in a hexachloro platinic acid ($H_2PtCl_6$) solution. In this case, the concentration of Pt in the hexachloro platinic acid is adjusted, so that the weight percent $a_1$ of Pt is in a range of 1% by weight<$a_1$≦5% by weight. Platinum compounds which can be utilized are various Pt-containing compounds such as $Pt(NH_3)_2(No_2)_2$. In carrying paradium (Pd), a paradium nitrate solution is used. In carrying iridium (Ir), a ammonium hexacholo-iridate solution (($NH_4)_2IrCl_6$) is used. Further, in carrying rhodium, a rhodium nitrate (Rh $(NO_3)_3$) is used.

First Embodiment

Production of Catalyst (a) The example 8 in Table 14, i.e., the modified alumina having an α-conversion rate R of 81% was placed in an amount of 98.5 into 21.4 g of a hexachloro platinic acid solution (having a Pt concentration of 7.0%) and sufficiently mixed. Then, water in the resulting mixture was removed using a rotary evaporator and thereafter, obtained solids were subjected to a drying at 120° C. for 4 hours and further to a firing in the atmosphere at 600° C. for 1 hour to provide a catalyst material having a Pt weight percent $a_1$ equal to 1.5% by weight.

(b) Then, 90 g of the catalyst material, 90 g of a cerium oxide powder having an average crystal grain size D of 78 Å, 100 g of 20% silica sol, 240 g of pure water and alumina balls were thrown into a pot, and the resulting mixture was subjected to a wet pulverization to prepare a slurry-like catalyst. In this case, the weight percent $A_1$ of the catalyst material is equal to 50% by weight.

A cordierite honeycomb support having a diameter of 25.5 mm and a length of 60 mm and having 300 cells of 10.5 mil was immersed into the slurry-like catalyst and then picked up from the slurry-like catalyst. An excessive amount of the catalyst was removed from the honeycomb support by injection of air. Thereafter, the honeycomb support was maintained under heating at 120° C. to dry the slurry-like catalyst, and further subjected to a firing in the atmosphere at 600° C. for one hour to retain the catalyst in the honeycomb support. In this case, the amount of catalyst retained in the honeycomb support was of 150 g/liter. This catalyst is called an example 1.

For comparison, a slurry-like catalyst was prepared in the same manner, except that a commercially available active alumina (γ-alumina having an α-conversion rate R of 0%) was used as an alumina. This slurry-like catalyst and a honeycomb support similar to that described above were used, and the catalyst was retained in the honeycomb support in the same manner as described above. In this case, the amount of catalyst retained in the honeycomb support was equal to the above-described amount and is called a comparative example 1.

Exhaust Gas-Assumed Purifying Test

Assuming an exhaust gas corresponding to a theoretic air-fuel ratio A/F of 14.6 and an air-fuel ratio A/F of 24.3 in an atmosphere containing an excessive amount of oxygen, two types of first and second test gases having compositions shown in Table 15 were prepared.

TABLE 15

| Constituent | First test gas (A/F = 14.6) (% by volume) | Second test gas (A/F = 24.3) (% by volume) |
| --- | --- | --- |
| $CO_2$ | 14.0 | 10.0 |
| $H_2$ | 0.17 | 0.05 |
| $C_3H_6$ | 0.12 | 0.08 |
| NO | 0.05 | 0.08 |
| CO | 0.05 | 0.10 |
| $O_2$ | 0.5 | 10.0 |
| $H_2O$ | 10.0 | 10.0 |
| $N_2$ | balance | balance |

In a purifying test, first, the catalyst of the example 1 was placed in a fixed-bed flow type reactor apparatus. Then, the first test gas was supplied to flow through the apparatus at a space velocity S.V. of $5 \times 10^4$ $h^{-1}$, wherein the temperature of the first test gas was risen from ambient temperature at 20° C./min, and the percent conversions of hydrocarbon (HC), carbon monoxide (CO) and nitrogen monoxide (NO) (which corresponds to NOx) were measured at a predetermined temperature. The second test gas was also used to measure the percent conversion of hydrocarbon (HC) and the like in the same manner. Further, a similar purifying test was carried out even with the catalyst of the comparative example 1.

Table 16 shows conditions for and results of the measurement.

TABLE 16

| Catalyst | α-conversion rate R of modified alumina (%) | Air-fuel ratio A/F | Measuring temperature of gas (° C.) | Conversion rate (%) | | |
|---|---|---|---|---|---|---|
| | | | | HC | CO | NO |
| Example 1 | 81 | 14.6 | 450 | 97 | 98 | 92 |
| Comparative example 1 | 0 | | | 98 | 98 | 70 |
| Example 1 | 81 | 24.3 | 250 | 98 | 90 | 59 |
| Comparative example 1 | 0 | | | 99 | 92 | 20 |

As apparent from Table 16, the catalyst of the example 1 exhibits a high percent conversion of hydrocarbon and the like. Particularly, the percent conversion of nitrogen monoxide (NO) in the atmosphere containing an excessive amount of air with an air-fuel ratio A/F equal to 24.3 is about three times of that provided in the comparative example 1.

This is due to a difference in physical properties between the modified alumina having the α-conversion rate equal to 81% and the active alumina having the α-conversion rate equal to 0.

Second Embodiment

Various catalysts were produced in the same manner as in the first embodiment. In this case, the total amount of catalyst material and cerium oxide ($CeO_2$) incorporated was determined at 180 g as in the first embodiment.

Table 17 shows the α-conversion rate R of the modified alumina, the average crystal grain size D of cerium oxide, the composition, the maximum NO conversion rate r and the gas temperature at which such percent conversion r was obtained, for the catalysts of examples 1 to 7 and comparative examples 1, 1, and 2.

In these catalysts, the average crystal grain size D of the cerium oxide is equal to 78 Å; the weight percent $a_1$ of Pt is equal to 1.5% by weight (constant); the weight percent $A_1$ of the catalyst material is equal to 50% by weight (constant), and the α-conversion rate R of the modified alumina is varied. The comparative example 1 is the same as the comparative example 1 in the first embodiment.

The purifying test was carried out in the same manner as in the first embodiment, using a second test gas (A/F=24.3) prepared to assume the atmosphere containing the excessive amount of air in the first embodiment. The same is true of other catalyst which will be described hereinafter.

TABLE 17

| Catalyst | α-conversion rate R of modified alumina (%) | Average grain size D of $CeO_2$ (Å) | Weight percent $a_1$ of Pt (% by weight) | Weight percent $A_1$ of catalyst material (% by weight) | Maximum NO conversion rate r (%) | Gas temperature (° C.) |
|---|---|---|---|---|---|---|
| Example 1 | 0.1 | 78 | 1.5 | 50 | 31 | 250 |
| Example 2 | 7 | 78 | 1.5 | 50 | 34 | 250 |
| Example 3 | 29 | 78 | 1.5 | 50 | 38 | 255 |
| Example 4 | 51 | 78 | 1.5 | 50 | 48 | 250 |
| Example 5 | 64 | 78 | 1.5 | 50 | 52 | 260 |
| Example 6 | 89 | 78 | 1.5 | 50 | 53 | 255 |
| Example 7 | 95 | 78 | 1.5 | 50 | 37 | 260 |
| Comparative example 1 | 0 | 78 | 1.5 | 50 | 22 | 245 |
| Comparative example $1_1$ | 98 | 78 | 1.5 | 50 | 22 | 265 |
| Comparative example 2 | 100 | 78 | 1.5 | 50 | 15 | 265 |

Table 18 shows the α-conversion rate R of the modified alumina, the average crystal grain size D of cerium oxide ($CeO_2$), the composition, the maximum NO conversion rate r and the gas temperature at which such percent conversion r was obtained, for the catalysts of examples 8 to 12.

In these catalysts, the α-conversion rate R of the modified alumina is equal to 81% (constant); the weight percent $a_1$ of Pt is equal to 1.5% by weight (constant); the weight percent $A_1$ of the catalyst material is equal to 50% by weight (constant); and the average crystal grain size D of cerium oxide is varied.

TABLE 18

| Catalyst | α-conversion rate R of modified alumina (%) | Average grain size D of $CeO_2$ (Å) | Weight percent $a_1$ of Pt (% by weight) | Weight percent $A_1$ of catalyst material (% by weight) | Maximum NO conversion rate r (%) | Gas temperature (° C.) |
| --- | --- | --- | --- | --- | --- | --- |
| Example 8 | 81 | 123 | 1.5 | 50 | 61 | 255 |
| Example 9 | 81 | 205 | 1.5 | 50 | 59 | 255 |
| Example 10 | 81 | 316 | 1.5 | 50 | 58 | 260 |
| Example 11 | 81 | 542 | 1.5 | 50 | 37 | 265 |
| Example 12 | 81 | 702 | 1.5 | 50 | 29 | 260 |

Table 19 shows the α-conversion rate R of the modified alumina, the average crystal grain size D of cerium oxide ($CeO_2$), the composition, the maximum NO conversion rate r and the gas temperature at which such percent conversion r was obtained, for the catalysts of examples 13 to 16 and comparative examples 3 to 6. The catalyst of the example 14 has the same structure as the catalyst of the example 1. The catalyst of the comparative example 6 includes a modified alumina and platinum (Pt) carried in the modified alumina. A catalyst of a comparative example 7 including cerium oxide ($CeO_2$) and platinum carried in the cerium oxide is also shown in Table 7.

In the catalysts of the examples 13 to 16 and the comparative examples 3 to 5, the α-conversion rate R is equal to 81% (constant); the average crystal grain size D of the cerium oxide ($CeO_2$) is equal to 78 Å (constant); the weight percent $a_1$ of Pt is equal to 1.5% by weight (constant); and the weight percent $A_1$ of the catalyst material is varied.

the α-conversion rate R of the modified alumina in a range of $0.1\% \leq R \leq 98\%$, if the weight percent $A_1$ of the catalyst material is in a range of 22% by weight$<A_1 \leq 88\%$ by weight, as in the catalysts of the examples 1 to 16. In this case, the weight percent $a_1$ of platinum (Pt) satisfies a range of 0.1% by weight$<a_1 \leq 5\%$ by weight. It can be seen from FIG. 10 that if the α-conversion rate R of the modified alumina is set in a range of $30\% \leq R \leq 95\%$, the maximum NO conversion rate r can be increased to a level equal to or greater than 39% and therefore, the preferable range of the α-conversion rate R of the modified alumina is of $30 \leq R \leq 95\%$.

Figure 11:
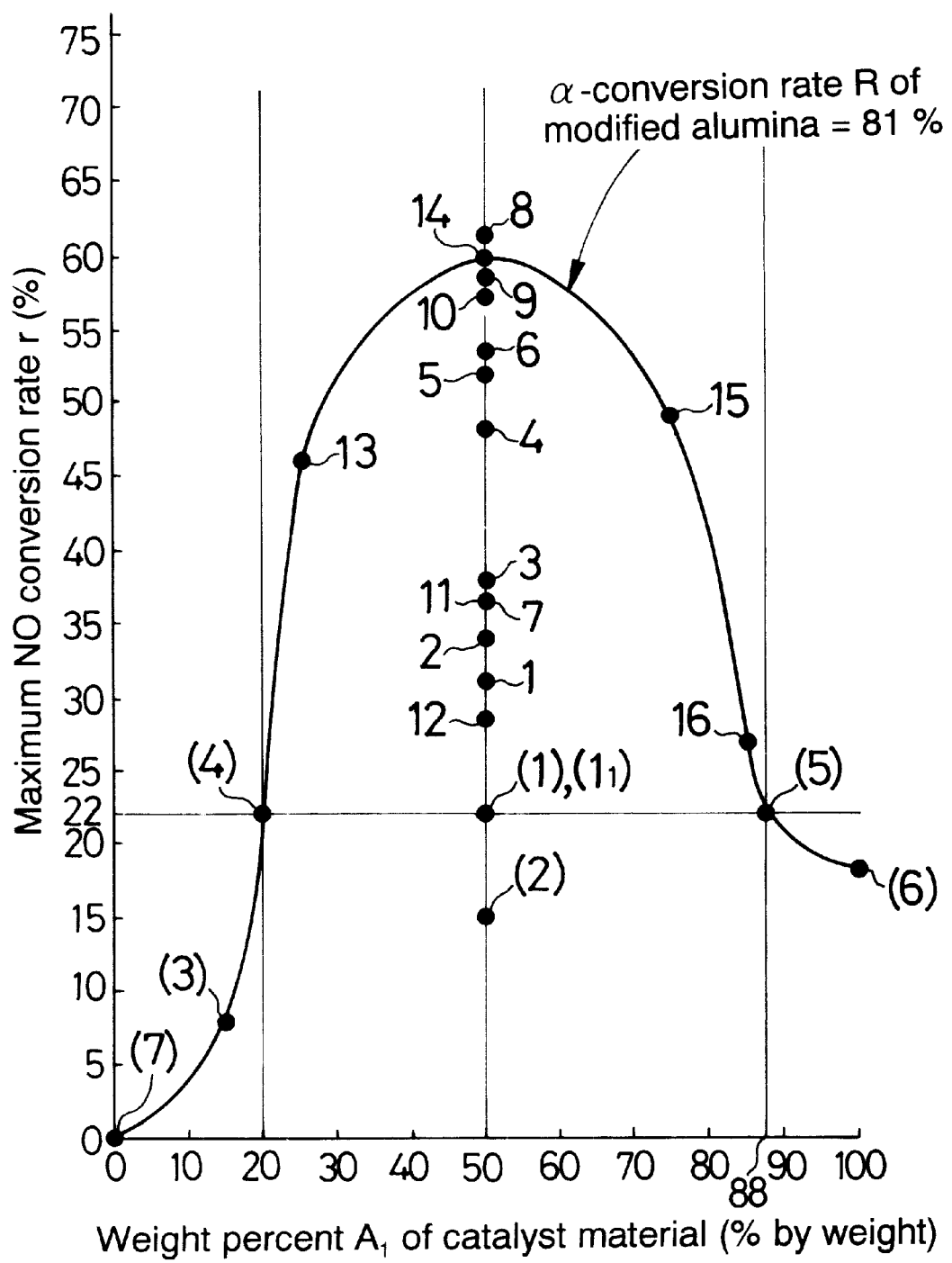
FIG. 11 is a graph illustrating the relationship between the weight percent $A_1$ of a catalyst material and the maximum NO conversion rate r.

FIG. 11 is a graph illustrating the relationship between the weight percent $A_1$ of the catalyst material and the maximum NO percent conversion taken from Tables 17 to 19. In FIG. 11, points 1 to 16 correspond to the examples 1 to 16, and points (1) and ($1_1$) to (7) correspond to the comparative examples 1 and $1_1$ to 7, respectively.

TABLE 19

| Catalyst | α-conversion rate R of modified alumina (%) | Average grain size D of $CeO_2$ (Å) | Weight percent $a_1$ of Pt (% by weight) | Weight percent $A_1$ of catalyst material (% by weight) | Maximum NO conversion rate r (%) | Gas temperature (° C.) |
| --- | --- | --- | --- | --- | --- | --- |
| Example 13 | 81 | 78 | 1.5 | 25 | 46 | 265 |
| Example 14 | 81 | 78 | 1.5 | 50 | 60 | 260 |
| Example 15 | 81 | 78 | 1.5 | 75 | 49 | 250 |
| Example 16 | 81 | 78 | 1.5 | 85 | 27 | 250 |
| Comparative example 3 | 81 | 78 | 1.5 | 15 | 8 | 290 |
| Comparative example 4 | 81 | 78 | 1.5 | 20 | 22 | 270 |
| Comparative example 5 | 81 | 78 | 1.5 | 88 | 22 | 250 |
| Comparative example 6 | 81 | — | 1.5 | 100 | 18 | 245 |
| Comparative example 7 | — | 78 | 1.5 | 0 | 0 | — |

Figure 10:
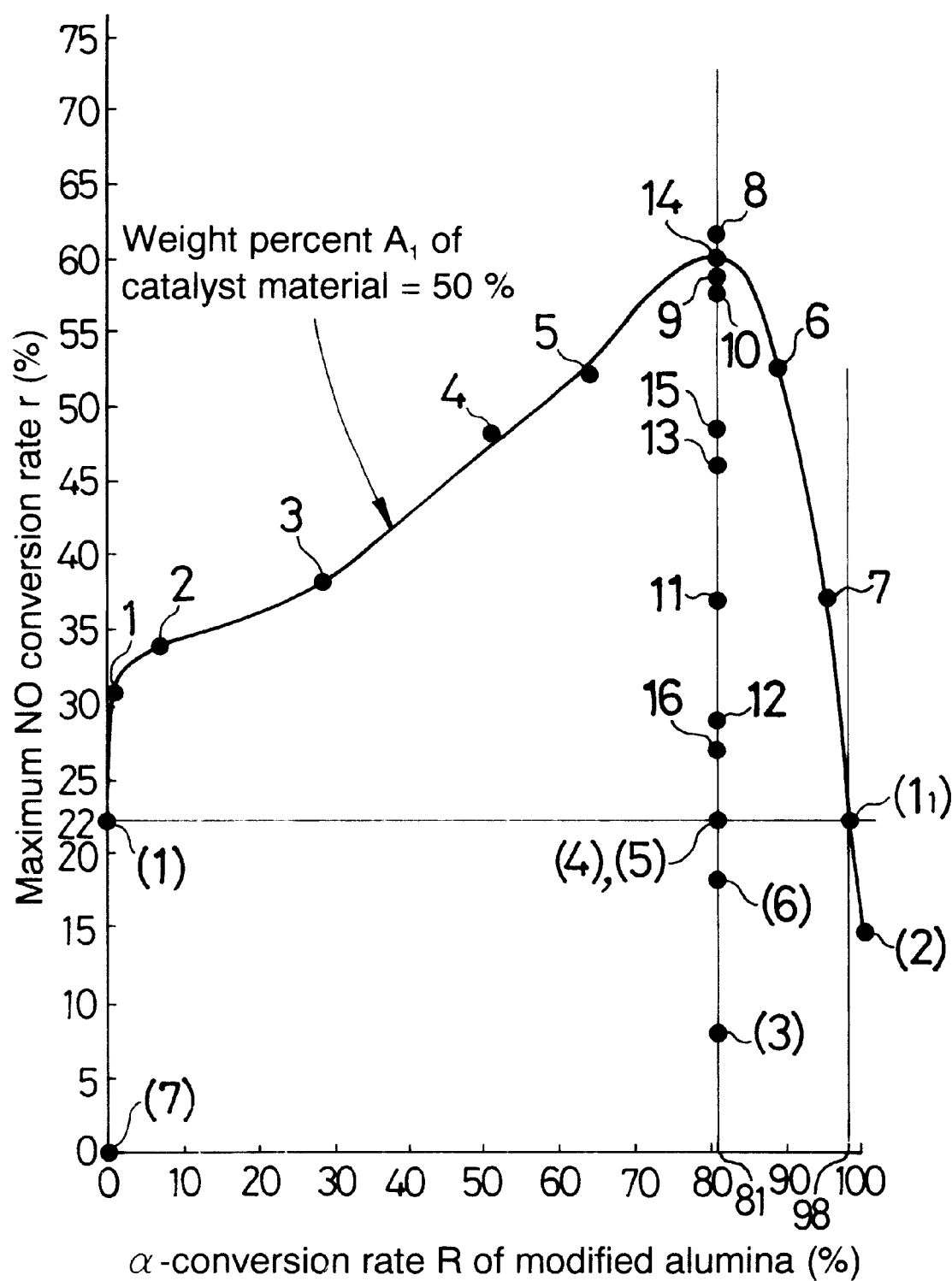
FIG. 10 is a graph illustrating the relationship between the α-conversion rate R of a modified alumina and the maximum NO conversion rate r.

FIG. 10 is a graph illustrating the relationship between the α-conversion rate R of the modified alumina and the maximum NO percent conversion and taken from Tables 17 to 19. In FIG. 7. Points 1 to 16 correspond to the examples 1 to 16, and points (1) and (11) to (7) correspond to the comparative examples 1 and $1_1$ to 7, respectively.

As apparent from FIG. 10 and Tables 17 to 19, the highest value of the maximum NO percent conversions r provided by the catalysts of the comparative examples 1 and $1_1$ to 7 is 22%. Therefore, it is possible to increase the maximum NO conversion rate r to a value greater than 22% in an atmosphere containing an excessive amount of air by setting As apparent from FIG. 11 and Tables 17 to 19, the highest value of the maximum NO percent conversions r provided by the catalysts of the comparative examples 1 and $1_1$ to 7 is likewise 22%. Therefore, it is possible to increase the maximum NO conversion rate r to a value greater than 22% in an atmosphere containing an excessive amount of air by setting the weight percent Al of the catalyst material in a range of 20% by weight$<A_1<88\%$ by weight, if the α-conversion rate of the modified alumina is in a range of $0.1\% \leq R \leq 98\%$, as in the catalysts of the examples 1 to 16. In this case, the weight percent $a_1$ of platinum (Pt) satisfies a range of 0.1% by weight$<a_1 \leq 5\%$ by weight. It can be seen from FIG. 11 that if the weight percent of the catalyst material is set in a range of 23% ≦A₁≦81% by weight, the maximum NO conversion rate r can be increased to a level equal to or greater than 39% and therefore, the preferable range of the weight percent of the catalyst material is of 23%≦A₁≦81% by weight.

Figure 12:
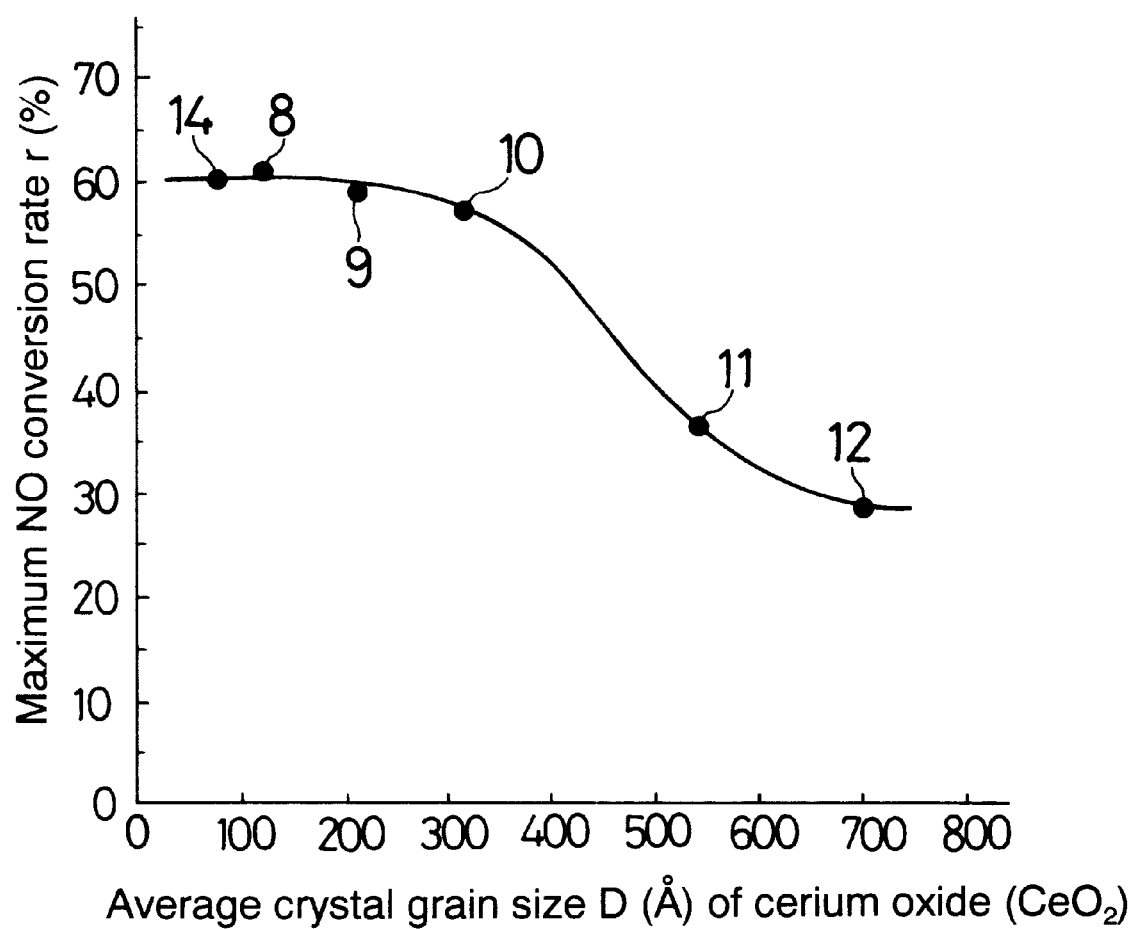
FIG. 12 is a graph illustrating the relationship between the average crystal grain size D of cerium oxide ($CeO_2$) and the maximum NO conversion rate r.

FIG. 12 is a graph illustrating the relationship between the average crystal grain size D and the maximum NO percent conversion for examples 8 to 12 and 14 and taken from Tables 17 to 19. In FIG. 12, points 8 to 12 and 14 correspond to the examples 8 to 12 and 14, respectively.

As apparent from FIG. 12 and Tables 18 and 19, the maximum NO percent conversion is increased, as the average crystal grain size D of the cerium oxide (CeO₂) is decreased. It can be seen from FIG. 12 that the average crystal grain size D of the cerium oxide (CeO₂) is preferably in a range of D<500 Å, and the optimal range is of D≦320 Å.

If the average crystal grain size D of the cerium oxide (CeO₂) is set in the above-described range, the specific surface area of the cerium oxide (CeO₂) can be enlarged, and the fine pores can also be enlarged. Therefore, it is possible to increase the probability of contact of the cerium oxide with nitrogen oxide (NOx) to increase the NOx percent adsorption per unit weight even in an atmosphere containing an excessive amount of air.

Third Embodiment

Various catalysts were produced in the same manner as in the first embodiment, except that 21.4 g of a palladium nitrate solution was used to carry palladium (Pd) in a modified alumina; 14.2 g of an ammonium hexachloroiridate solution (having an Ir concentration of 3.5%) was used to carry iridium in an modified alumina; and 14.2 g of a rhodium nitrate solution (having a Rh concentration of 3.5%) was used to carry rhodium in a modified alumina. In this case, the total amount of catalyst material and cerium oxide (CeO₂) incorporated was likewise set at 180 g.

Table 20 shows the α-conversion rate R of the modified alumina, the average crystal grain size D of the cerium oxide, the composition, the maximum NO conversion rate r and the gas temperature at which such maximum NO conversion rate r was obtained, for examples 1 to 3 and comparative examples 1 to 3.

A purifying test was carried out in the same manner as in the first embodiment, using a second test gas (A/F=24.3) assuming the atmosphere containing the excessive amount of air in the first embodiment.

TABLE 20

| Catalyst | α-conversion rate R of modified alumina (%) | Average grain size D of CeO₂ (Å) | Weight percent a₁ of Pd, Ir, Rh (% by weight) | Weight percent A₁ of catalyst material (% by weight) | Maximum NO conversion rater (%) | Gas temperature (° C.) |
| --- | --- | --- | --- | --- | --- | --- |
| Example 1 | 81 | 78 | Pd:1.5 | 50 | 36 | 240 |
| Comparative example 1 | 0 | 78 | Pd:1.5 | 50 | 12 | 230 |
| Example 2 | 81 | 78 | Ir:0.5 | 50 | 39 | 290 |
| Comparative example 2 | 0 | 78 | Ir:0.5 | 50 | 12 | 285 |
| Example 3 | 81 | 78 | Rh:0.5 | 50 | 36 | 310 |
| Comparative example 3 | 0 | 78 | Rh:0.5 | 50 | 9 | 305 |

It can be seen from Table 20 that the maximum NO percent conversion provided by the catalysts of the examples 1 to 3 in the atmosphere containing the excessive amount of air was increased to a level three times of those provided when the active alumina (γ-alumina) was used, as in the catalysts of the comparative examples 1 to 3, because the modified alumina having the α-conversion rate R equal to 81% was used in the examples 1 to 3.

Effect of the Invention

According to the present invention, it is possible to provide an exhaust emission control catalyst wherein the NOx percent conversion can be increased in a wider range of temperature of an exhaust gas by using the modified alumina specified as described above.

According to the present invention, it is possible to provide an exhaust emission control catalyst which exhibits a high NOx percent conversion even in an atmosphere containing an excessive amount of air by specifying the α-conversion R of the modified alumina, the weight percent A₁ of the catalyst material and the weight percent a₁ of the catalyst material as described above.

According to the present invention, it is possible to provide an exhaust emission control catalyst which includes a catalyst material formed of an alumina and a catalytic metal carried in the alumina, and cerium oxide (CeO₂), and which exhibits a high NOx percent conversion even in an atmosphere containing an excessive amount of air by specifying the α-conversion R of the modified alumina, the weight percent A₁ of the catalyst material as described above.

Further, according to the present invention, it is possible to provide a process for easily mass-producing an exhaust emission control catalyst having excellent characteristics as described above.

What is claimed is:

1. An exhaust emission control catalyst comprising a catalyst material having a catalyst metal carried on an alumina, and a solid acidic aluminosilicate having a molecular sieve property, said exhaust emission control catalyst being a mixture of said catalyst material and said aluminosilicate and being carried on a support, wherein said alumina is a modified alumina having an α-conversion rate R set in a range of $0.1\% \leq R \leq 95\%$, and said aluminosilicate is a modified zeolite which is obtained by subjecting an unmodified zeolite to a dealuminization.

2. An exhaust emission control catalyst according to claim 1, wherein the weight percent $A_1$ ($=\{A/(A+B)\} \times 100$) of said catalyst material is set in a range of 11% by weight $\leq A_1$ (95% by weight, wherein A represents an amount of said catalyst material by weight and B represents an amount of said aluminosilicate by weight.

3. An exhaust emission control catalyst according to claim 1, wherein said modified zeolite is a modified ZSM5 zeolite.

4. An exhaust emission control catalyst according to claim 2, wherein said modified zeolite is a modified ZSM5 zeolite.

* * * * *